United States Patent [19]

Fitzgerald

[11] Patent Number: 5,509,065
[45] Date of Patent: Apr. 16, 1996

[54] DUAL SPAN MONITORING SYSTEM FOR MAINTENANCE SHELF CONTROL

[75] Inventor: Michael T. Fitzgerald, Bolingbrook, Ill.

[73] Assignee: Teltrend Inc., St. Charles, Ill.

[21] Appl. No.: 151,514

[22] Filed: Nov. 12, 1993

[51] Int. Cl.⁶ .................................................. H04M 3/08
[52] U.S. Cl. ........................... 379/279; 379/2; 379/10; 379/102
[58] Field of Search ......................... 379/22, 10, 279, 379/2, 102

[56] References Cited

U.S. PATENT DOCUMENTS 5,224,149  6/1993  Garcia ........................................ 379/22

*Primary Examiner*—Ahmad F. Matar
*Attorney, Agent, or Firm*—Banner & Allegretti, Ltd.

[57] ABSTRACT

A telecommunication system is described that has an interface and multiple lines, such as T-1 lines. The multiple lines include at least one service line and at least one spare line. The interface comprises a bus across the service line and spare line and a common controller. The bus includes switches for interconnecting and disconnecting the bus from one or more of the multiple lines. The common controller accomplishes multiple functions: (a) responding to a transfer signal by interconnecting the spare line to the bus and disconnecting the service line from the bus, (b) recognizing a restoration of service signal on the service line upon which service was disconnected, and (c) sending commands to the switches for reconnecting the service line to the bus and disconnecting the spare line from the bus. Further, in one embodiment, the common controller also recognizes a restoration of service signal on the spare line. The transfer signals and restoration of service signals are provided to the telecommunications system by an outside source, such as a telephone company central office.

7 Claims, 5 Drawing Sheets

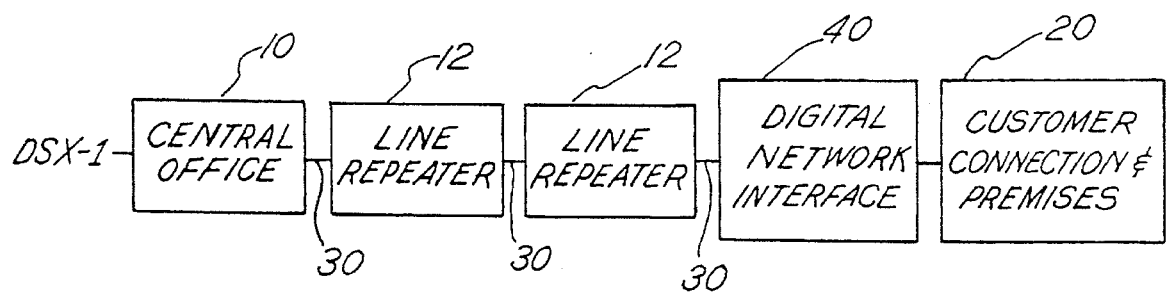
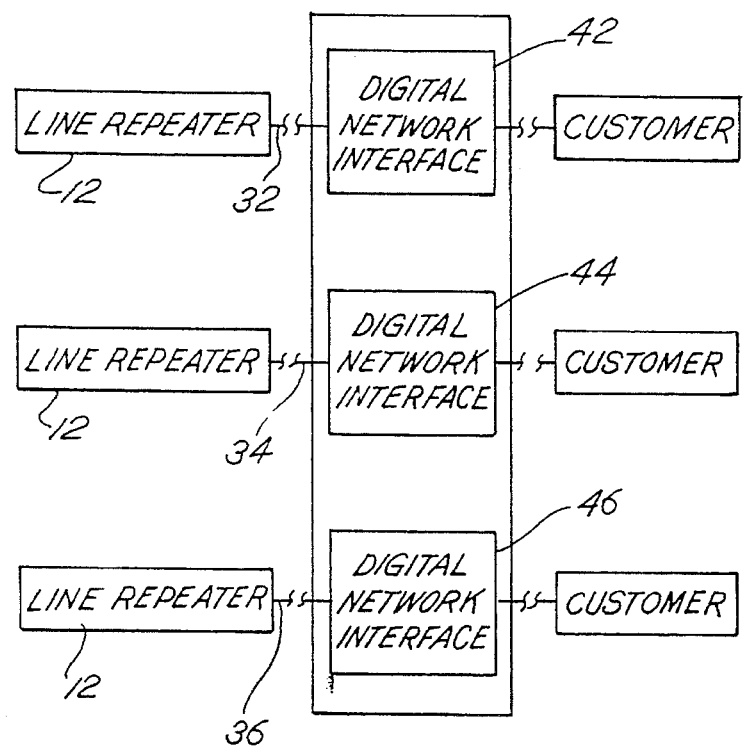

DUAL SPAN MONITORING SYSTEM FOR MAINTENANCE SHELF CONTROL

BACKGROUND OF THE INVENTION

The present invention relates generally to telecommunication transmission facilities and, more particularly, to a maintenance shelf system having a digital network interface and a common control unit with a protection switching mechanism. Many telecommunication transmission facilities include a central office which may transmit data, or "payload," signals over transmission lines to customer equipment on the customer's premises. Typically, digital payload signals are sent over the transmission lines to a digital network interface. These may also be referred to as a Network Interface Unit ("NIU").

The NIU is the demarcation between the telephone operating company's side of the telephone line and a customer's side of the telephone line. Electrically, the NIU is generally transparent to payload signals, but can be used for special maintenance functions, such as loop back. A channel bank receives signals from the NIU and converts the payload signals to analog signals. The channel bank transmits an analog signal for each channel differentially on two wire conductors, known as a Tip-Ring pair.

The Bell telephone system in the United States, for example, has widely utilized digital time-domain multiplexing pulse code modulation systems. This is known as a T-1 transmission system. Each T-1 transmission system carries 24 8-KB/second voice or data channels on two pairs of exchange grade cables. One pair of cables is provided for each direction of transmission. T-1 transmission systems are used in multiples 37 N", providing 37 N"-times-24 channels on 37 N"-times-two cable pairs. The cables exist in sections, called "spans," between and beyond a series of regenerative repeaters.

Payload signals are received by the telephone company and are transmitted, via the first spans of transmission lines, to alternating series of regenerative repeaters and further spans. Regenerative repeaters are spaced approximately every 6,000 feet, and the "spans" are the lengths of the cables between the repeaters. Each repeater receives data from a preceding repeater (or in the case of the first repeater, the central office) via a span on either side of the repeater. Each repeater generally recognizes pulses on the spans, however degraded, and regenerates clean pulses on the next spans.

The repeaters and cable spans continue until the lines extend to the NIU. From the NIU, customer connections continue into the customer premises.

A spare set of transmission cables, or a "spare line," is desirable, to provide for events of natural disaster, accident, maintenance, and upgrade. A spare transmission line is often provided to permit switching the spare transmission line into service in substitution for any one of the 37 N" multiple service lines which might become disabled. This is known as 1:N protection switching.

Since each T-1 span requires a network interface unit and multiple spans are typically routed together, multiple network interfaces are placed in the same physical location. The mounting that provides access to the network interface is called a maintenance shelf. Maintenance shelves are also known to provide a common control unit that serves as a remote control for the switching of a spare line in a 1:N protection system. Remote control of the span switching process reduces the need for technician visits to maintenance shelves located miles from telephone company central offices.

It is known to provide such a protective switching mechanism in which the mechanism monitors the inoperative line for a "restore service" signal and returns the service and spare lines to the original condition in response to such a signal. Unfortunately, while advantageous, such switching mechanisms do not as completely eliminate technician visits to maintenance shelves as would be desired. U.S. Pat. No. 5,224,149 is incorporated by reference, for additional illustration of the state of the art.

SUMMARY OF THE INVENTION

As described above, past protection switching mechanisms associated with spare telephone lines (such as T-1 lines) have monitored the "swapped" or interrupted transmission cable pairs, or "line," for a restoration of service signal. The present invention comprises a protection mechanism associated with a spare line, providing a more sophisticated monitoring of the lines, resulting in a higher quality of switching.

In a principal aspect, the present invention is a telecommunications system protective switching mechanism. The mechanism may be utilized in a unit that is interconnected to multiple telecommunication lines. The unit receives a transfer signal and a restoration of service signal. At least one of the lines is a service line, and at least one of the lines is a spare line.

The switching mechanism comprises a bus across the service lines and the spare line, and a common controller. The bus is interconnected to the controller and also includes switches. The switches interconnect and disconnect, on command, one or more of the lines from the bus.

The common controller recognizes and accepts from the bus a transfer signal, where such transfer signal reflects a need to transfer payload from a particular service line to a spare line. The common controller responds to the transfer signal by instructing the bus to interconnect the spare line to the bus and to disconnect the particular service line from the bus. Thereafter, the common controller further recognizes and accepts from the bus a restoration of service signal, regardless of whether the restoration of service signal is transmitted to the bus (i) on the particular service line that has been disconnected from the bus or (II) on the spare line that was connected to the bus as a result of the transfer signal. In response to such a restoration of service signal, the common controller instructs the bus to reconnect the particular service line to the bus. These transfer and restoration of service signals are typically generated externally, whether at the central office or at another remote location, and are in turn transmitted along the appropriate line, through the bus and to the common controller. the invention has the capability of recognizing a restoration of service signal sent to the controller on the interrupted service line, or a restoration of service signal sent to the controller on the spare line. In the event, after an interruption of service, that it is desired to disconnect the spare line from the bus and return the interrupted line to its original connection, a restoration of service signal need not be transmitted on the interrupted line. Among situations not addressed by prior maintenance shelf systems, the situation of a mistaken swap of a service line and the spare line is addressed. As an example, a swap may be mistaken such that a line which is not, and has never been, in service may be swapped for the spare line. With such a swap, it is difficult or impossible to send a restoration of service signal without the invented interface and controller.

This and other advantages of the present invention, in the described aspect, and other aspects, will be fully appreciated from an understanding of the detail of the preferred embodiment, and for that and additional purposes, a detailed description follows.

BRIEF DESCRIPTION OF THE DRAWING

The preferred embodiment of the invention is described hereafter, with reference to the accompanying drawing. The drawing consists of seven figures. Each figure is briefly described as follows:

FIG. 1 is a schematic diagram of a typical T-1 DS-1 wire telecommunications transmission system, of the general type with which the invention is typically used;

FIG. 2 is a schematic diagram, in greater detail than in FIG. 1, of the interface connection of the system of FIG. 1 to customer equipment;

DETAILED DESCRIPTION OF THE PREFERRED EMBODIMENT

Figure 3:
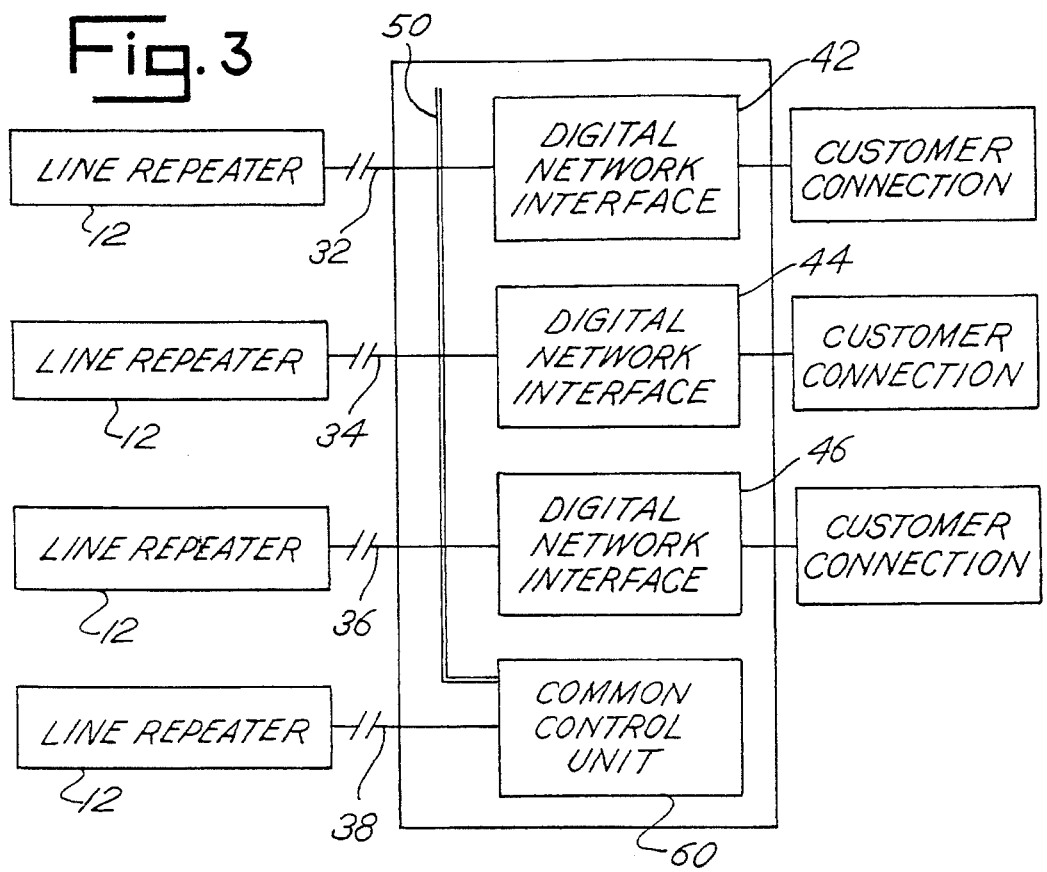
FIG. 3 is a schematic diagram, in greater detail than FIG. 1 or 2, of the interface connection of FIG. 2, with the switching mechanism of the present invention illustrated in a "ready," or armed, condition.

Referring to FIG. 1, a typical T-1, DS-1 wire telecommunication transmission system extends from a central office 10 to customer premises 20. The system comprises multiple regenerative repeaters 12 each labelled "line repeater," a digital network interface 40 adjacent the customer premises, and spans 30 between and among the central office, line repeaters, and digital network interface. According to, for example, the T-1 standard, digital signals are transmitted at a rate of 1.544 M bit per second.

As shown in FIG. 2, large volume applications require several T-1, DS-1 lines to provide all needed communications to a single location. Multiple spans 32, 34, 36 are the terminal spans of multiple T-1, DS-1 systems as in FIG. 1. Multiple digital network interfaces 42, 44, 46 interconnect with the spans 32, 34, 36, respectively. Numerous customer connections are provided.

As in the past, a spare "span" (a complete, spare T-1, DS-1 system) 38 is sometimes provided, as shown in FIG. 3. In such a situation, a bus structure 50 is interconnected with all the spans 32, 34, 36, 38, etc. through a group of relays (not shown in FIG. 3). The relays are operated under control of a common control unit 60, to provide for switching of the spare span into substitution for any disabled span among the spans 32, 34, 36, etc. No special provision is made for signalling of restored service on the disabled span. Instead, the common control unit 60 merely monitors the disabled span for such restore service signals as may be sent on the disabled span, after termination of its disability by repair or the like.

Figure 4:
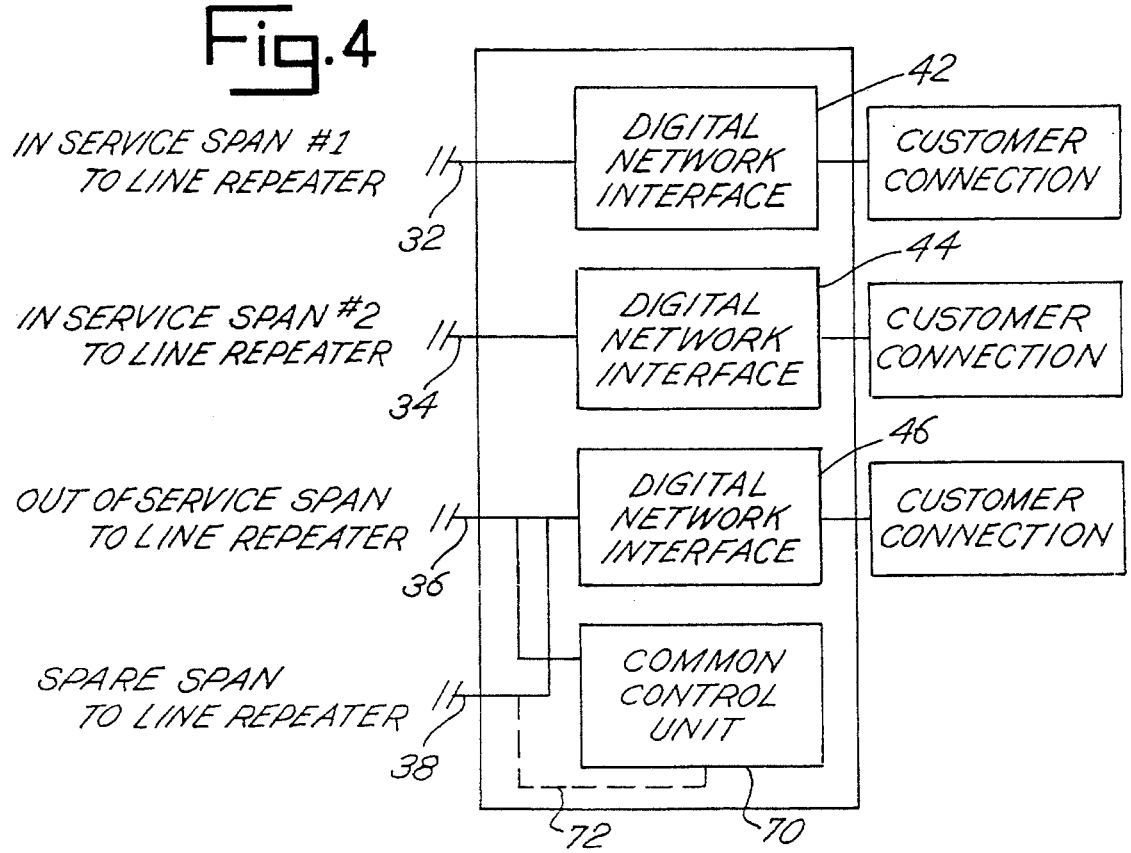
FIG. 4 is a schematic diagram, similar to FIG. 3, illustrating the preferred embodiment of the present invention as it functions to switch a disabled span and monitor for a return to normal service.

Referring to FIG. 4, the preferred embodiment accomplishes more. The common control unit 70 of the preferred embodiment connects with a bus structure 50, as shown in FIG. 3 (not shown in FIG. 4), and as shown during the exemplary switching of FIG. 4, monitors in a more advantageous manner for restoration of service. Where a span such as span 36 becomes disabled, the common control unit 70 switches the spare span 38 into substitution for the disabled span 36. As in FIG. 4, the spare span 38 interconnects with the digital network interface 46 formerly interconnected with the service span 36, now disabled. In a broader aspect, the common control unit 70 monitors the disabled span, and as shown by the dashed line of connection 72, the common control unit 70 also monitors the spare span 38. A restoration of service signal on either span 36 or 38 is recognized by the common control unit 70.

Figure 5:
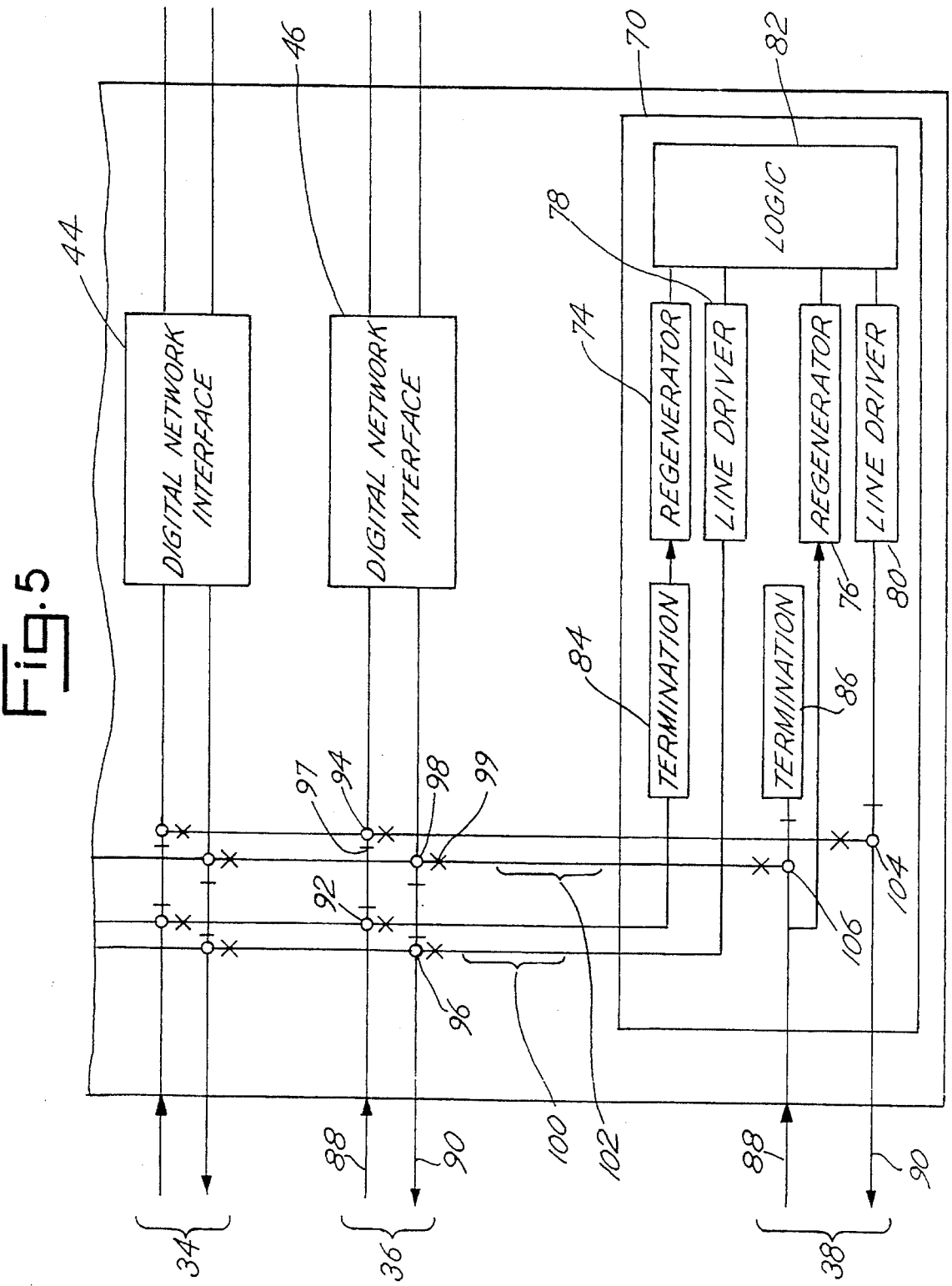
FIG. 5 is a schematic diagram, in still greater detail, of the preferred embodiment of the invention, in its operating environment.

Referring to FIG. 5, the common controller unit 70 incorporates signal regenerators 74, 76, line drivers 78, 80, a logic control element 82, and termination connections 84, 86. The regenerators 74, 76 are wire connected to provide regenerated signals to the logic control element 82, and the line drivers 78, 80 are wire connected to accept output of the logic control element 82.

The service spans 32, 34, 36, 38 include separate signal-receiving and transmission cable pairs. See FIG. 4. As shown in relation to span 36, by example, the span 36 includes signal-receiving cable pair 88 and transmission cable pair 90. The cable pairs 88, 90 extend to the digital network interlace 46. Two relays 92, 94 are spaced along cable pair 88, and two relays 96, 98 are spaced along cable pair 90. The relays 92, 94, 96, 98 are all normally closed for transmission to and from the digital network interface 46 as indicated by a cross-mark such as 97 across the cables. The first relays 92, 96 are interconnected into the signal cabling 100 of the bus 50, and the second relays 94, 98 are interconnected into the maintenance cabling 102 of the bus 50. All relays 92, 94, 96, 98 are normally open against transmission along the bus 50, as indicated by an "X" such as 99 across the cables.

The spare span 38 has signal-receiving cable pairs 88 and transmission cable pairs 90, as well. The line driver 80 of the common control unit 70 is interconnected to the transmission cabling 90 of the spare span 38, through a spare span transmission relay 104. The signal-receiving cabling 88 of the spare span 38 is directly interconnected to the regenerator 76 of the common control unit 70. The signal-receiving cabling 88 of the spare span 38 is also interconnected to the termination connection 86, through a spare span signal-receiving relay 106, which is normally closed for transmission from the signal-receiving cabling 88 to the termination connection 86.

The relays 104, 106 are also interconnected into the maintenance cabling 102 of the bus 50, and are normally open against transmission along the bus. The signalling cabling of the bus 50 extends from the first relays 96 to the line driver 78 and from the first relays 92 to the termination connection 84 and regenerator 74.

Figure 6:
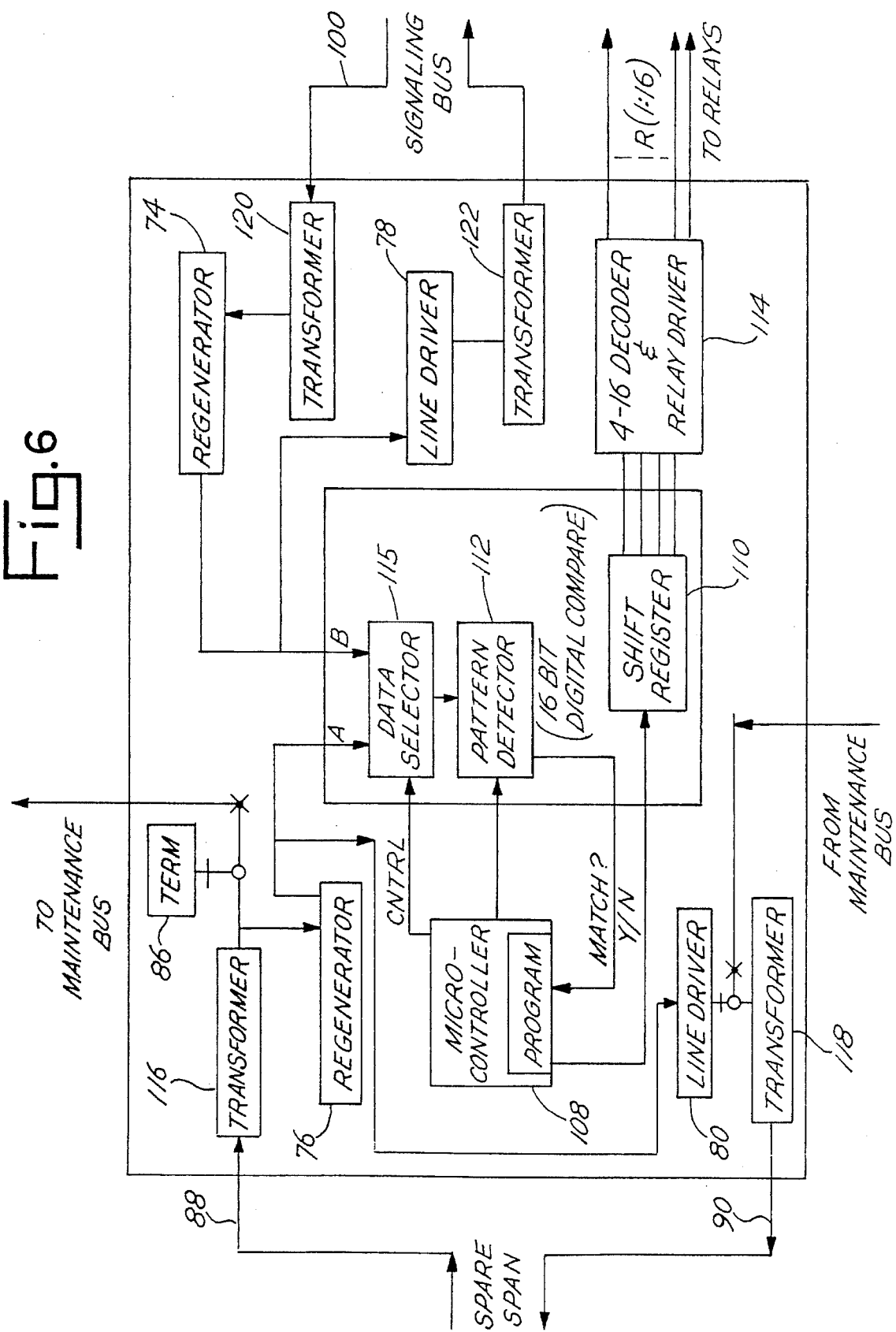
FIG. 6 is again a schematic diagram, in the greatest detail, of the preferred embodiment.
Figure 7:
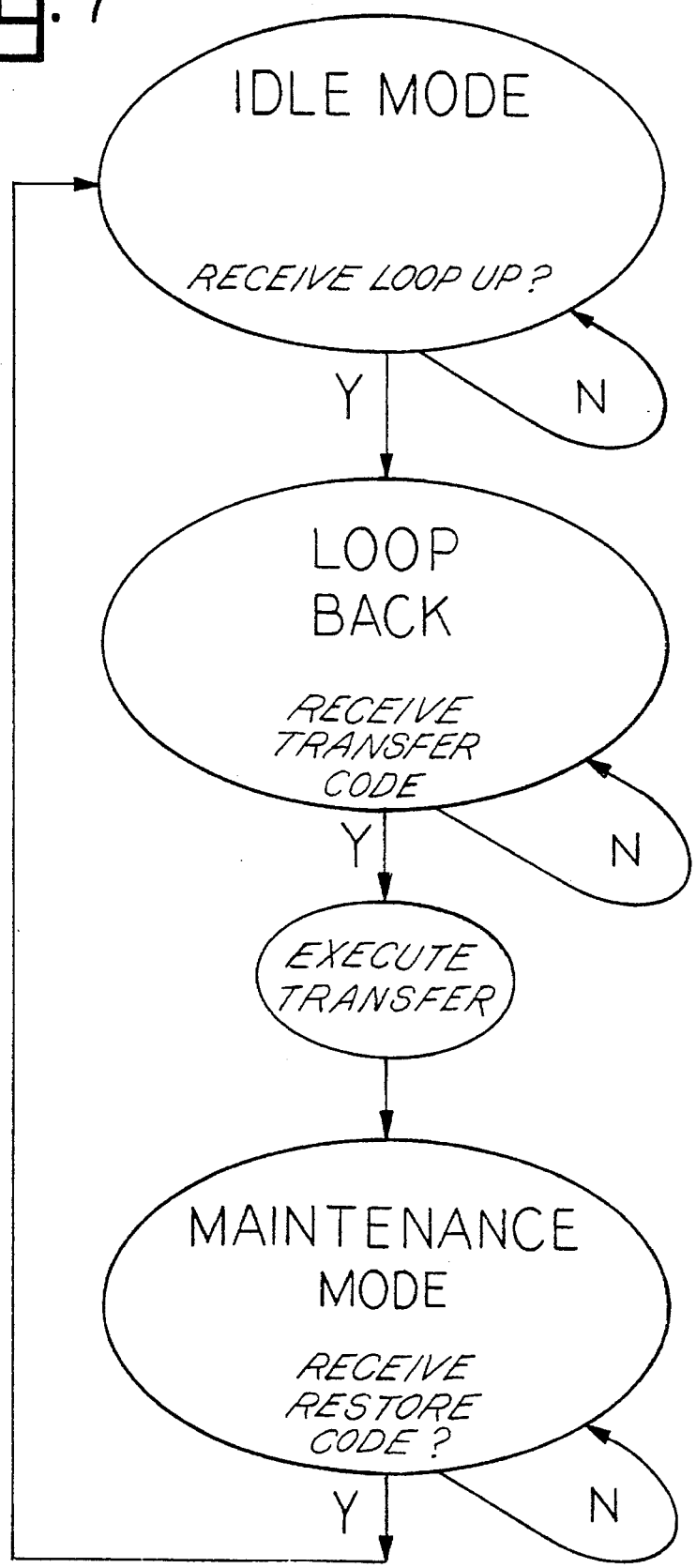
FIG. 7 is a schematic diagram of the states of operation of the preferred embodiment.

Referring to FIGS. 6 and 7, the common control unit 70 includes a microprocessor or micro-controller 108. The microprocessor 108 is programmed according to the source code following this description, which is incorporated by reference. The program of the microprocessor 108 provides the control unit 70 with three basic states: an idle state or mode, a "ready" and "looped up" state, and a maintenance state or mode. In the idle state, the control unit 70 awaits a "loop up" and arming signal. On receipt of a "loop up"

signal, the control unit 70 is armed and begins monitoring for transfer codes. On receipt of a transfer code, indicating that the spare span should be substituted for a service span, the control unit 70 changes to the maintenance state, in which the spare span is substituted, and the control unit 70 monitors for a restore code. A unique transfer code for each service span identifies which service span is to have the spare span "swapped" for it, and the control unit 70 responds uniquely to each transfer code.

On receipt of the restore code, the control unit 70 returns to the idle mode and the spare span returns to an inactive status. The restore code is the same for each line.

As shown in FIG. 6, the microprocessor 108 controls a shift register 110, a pattern detector 112, and a data selector 115. Through the shift register 110, the microprocessor controls a decoder and relay driver 114, and ultimately controls the state of all relays shown in FIG. 5. The microprocessor 108 establishes the patterns for recognition in the pattern detector 112, and the data for selection in the data selector 115. A match of pattern in the pattern detector 112, from data received from the data selector 115, is recognized by the microprocessor 108, and causes change of state of the shift register 110.

The signal to the data selector 115 is from two sources. A first source is the signal-receiving cabling of the spare span, through a transformer 116 and the regenerator 76. The regenerator 76 also supplies the line driver 80, and through a transformer 118 and relay 104, interconnects to the transmission cabling 90 of the spare span 38. A second source is the signal-receiving cabling of the signal bus 100, through a transformer 120 and regenerator 74. The regenerator 74 also provides current to the line driver 78, and through a transformer 122 to the transmission cabling of the signal bus.

Although the foregoing description of the preferred embodiment will enable a person of ordinary skill in the art to make and use the invention, the following detailed assembly language listing is included below. The listing provides detailed information concerning the programming and operation of the overall system. Additional detailed features of the system will become apparent to those skilled in the art from reviewing the program.

```
;*********************************************************************
;
;                MAINTENANCE SHELF CONTROLLER
;
;                © 1993 Teltrend Incorporated
;
;********************************************************************* region "COPY"

DB      "COPYRIGHT 1993"

region "MAIN"
;-----------------------------------------------------------------
; macro routine for debounce checking
;-----------------------------------------------------------------
chk_debounce:      #macro
chk_man_debounce$$:
    LDA     #015D           ;3 ms from 0 to FF
    LDX     #0FFH
D_2_LOOP_man_lpbk$$:
    BRSET   $2,$3,chk_no_man_debounce$$     ;JUMP IF line goes non_active
    DEX
    BNE     D_2_LOOP_man_lpbk$$
    DECA
    BEQ     D_2_EXIT_man_lpbk$$
    LDX     #0FFH
    JMP     D_2_LOOP_man_lpbk$$
D_2_EXIT_man_lpbk$$:
    BRA     chk_debounce_EXIT$$             ;return to the caller,success
chk_no_man_debounce$$:                      ;line is non_active
    LDA     #020D                  ;60 ms debounce time
    LDX     #0FFH                  ;
D_2_LOOP_man_lpbk_n$$:
    BRCLR   $2,$3,chk_man_debounce$$        ;JUMP IF line goes active
    DEX
    BNE     D_2_LOOP_man_lpbk_n$$
    DECA
```

```
        BEQ     D_2_EXIT_man_lpbk_n$$
        LDX     #0FFH
        JMP     D_2_LOOP_man_lpbk_n$$
D_2_EXIT_man_lpbk_n$$:
        BRA     $1                      ;jmp to the caller,fail
chk_debounce_EXIT$$:
        #endm region "ports"
;------------------------------------------------------------------
;------------------------------------------------------------------
        #define     POWER_LED       7,APORT  ;(O) 1,CONTROLS XILINK RESET LINE
        ;#define    DONE_PIN        6,APORT  ;(I) 0,FOR MONITORING XILINK
        #define     LD_SHIFT        5,APORT  ;(O) 0,LATCHS 8 BIT WORD TO G.A.
        #define     E2_DATA_IN      4,APORT  ;(I)
        #define     SPARE_LOS_LED   3,APORT  ;(O) 1,spare loss of signal
        #define     E2_SELECT       2,APORT  ;(O)
        ;#define    spare_3         1,APORT  ;(O)
        #define     MAINT_LED       1,APORT  ;(O) 0,maintenance LED
        #define     SENSE_PIN       0,APORT  ;(O) 1,power up diode define     DATA_SEL        7,BPORT  ;(O) 0,NOT A   B SELECT LINE
        #define     SER_DATA        6,BPORT  ;(O) 0,SERIAL DATA TO E^2 AND XILINK
        #define     MANUAL_LBK_O_N  5,BPORT  ;(I) 1,manuel lpbk switch
        #define     spare_5         4,BPORT  ;(O)
        #define     CLK_INHIBIT     3,BPORT  ;(O) 1,esf clock inhibit
        #define     LPBK_LED        2,BPORT  ;(O) 1,lpbk led
        #define     RLY_RESET       1,BPORT  ;(O) 1,relay reset 0,relay set
        #define     spare_6         0,BPORT  ;(O)

#define     SER_CLK         7,CPORT  ;(O) 1,SERIAL DATA CLK FOR E^2 & XILINK
        #define     SWAP_PIN        6,CPORT  ;(O) 0,dni exists, finish swap
        #define     MAINT_RLY       5,CPORT  ;(O) 0,maintenance relay
        #define     BPV_IN          4,CPORT  ;(I) 1,BPV
        #define     X_RESET         3,CPORT  ;(O) 1,CONTROLS XILINK RESET LINE
        #define     RESTORE_SW      2,CPORT  ;(I) 1,relay restore switch
        #define     CCLK            1,CPORT  ;(O) 1,CLK FOR DOWNLOADING AFTER RESET TO XILINKS
        #define     bit_193_MCSDATA 0,CPORT  ;(O,I) 1,esf bit 193 and mcs file data ouput define     LOS_AIS_SW_N    4 DPORT  ;(I) 1,AIS          0,NO RESPONSE
        #define     SF_ESF_SW       3,DPORT  ;(I) 1,INBAND(SF)   0,ESF
;------------------------------------------------------------------
```

```
#define    SENDING_ONES    0,FLAG1   ;Placeholder-no longer used
#define    OOS_LPBK        2,FLAG1   ;out of service lpbk = 1
#define    LOOP_FLAG_O     3,FLAG1   ;office lpbk 0=NONE 1=LOOPBACK ON
#define    COMP_FLAG       4,FLAG1   ;
#define    GOOD_PATH       5,FLAG1
#define    MAINT_FLASH     6,FLAG1   ;Maintenance mode LED flash
define    ARM_FLAG        7,FLAG1 define    sf_rcv_arming   0,SF_CURRENT_STATE
define    sf_rcv_lpdwn    1,SF_CURRENT_STATE define    timeout_flag    2,FLAG3
define    LP_2SEC_DET     6,FLAG3   ;Set when loopup code has been
                                     ;qualified for 3 seconds.
#define    STATE_CHANGE_O  0,FLAG4   ;flag for manuel lpbk buttom
#define    HARD_LOOP_O     2,FLAG4   ;1= in manuel lpbk toward office
#define    HARD_LOOP       4,FLAG4   ;1= manuel lpbk buttoms are pressed
#define    man_lpbk_O      5,FLAG4
define    LPBK_TO_DISABLE 7,FLAG4 define    LOS_AIS_SW_FLAG 0,FLAG5   ;1=LOS_AIS_SW is enable
define    LOS_SPARE_FLAG  1,FLAG5   ;1=LOSS of SIG from SPARE LINE
#define    SF_ESF_FLAG     2,FLAG5   ;1=INBAND DETECTION else ESF DL
#define    SF_LED          4,FLAG5   ;0=SF framed
#define    ESF_LED         5,FLAG5   ;0=ESF framed
#define    SPAN_AIS        6,FLAG5   ;1=require to send AIS to DSX
define    DL_16BITS_FLAG  7,FLAG5   ;=1=check loop codes until 16 DL define    ERR_CNT0        7,GATE_ARRAY_REG2   ;error count of control byte to xilinx
define    ERR_CNT1        6,GATE_ARRAY_REG2   ;error count of control byte to xilinx
#define    ERR_CNT2        5,GATE_ARRAY_REG2   ;error count of control byte to xilinx
#define    ERR_CNT3        4,GATE_ARRAY_REG2   ;error count of control byte to xilinx
#define    ERR_CNT4        3,GATE_ARRAY_REG2   ;error count of control byte to xilinx
#define    CONT_C          2,GATE_ARRAY_REG2   ;C cross bit of control byte to xilinx
#define    CONT_B          1,GATE_ARRAY_REG2   ;B FAC bit of control byte to xilinx
define    CONT_A          0,GATE_ARRAY_REG2   ;A DSX bit of control byte to xilinx define    framer_side     0,power_byte        ;1 bit to xilinx
define    spare_cutoff    1,power_byte        ;1 bit to xilinx
define    oos_cutoff      2,power_byte        ;1 bit to xilinx define    main_ais_state           1,main_current_state
define    main_ais_override_state  0,main_current_state
```

```
define     main_in_lpbk_state    2,main_current_state define     ESF_ARM_DET           0,ESF_CURRENT_STATE  ;1=rcv esf lpup code
define     ESF_DWN_DET           1,ESF_CURRENT_STATE  ;1=rcv esf lpdn code
define     get_esf_lpbk          7,ESF_CURRENT_STATE  ;receive esf lpbk codes flag define     ignore_esf_lpup       0,ESF_IGNORE_STATE   ;1=ignore esf lpup code
define     ignore_esf_lpdn       1,ESF_IGNORE_STATE   ;1=ignore esf lpdn code
define     ignore_esf_code       7,ESF_IGNORE_STATE   ;1=ignore esf lpbk code ;----------------------------------------------------------------
; MASK BIT FOR TIMER CAPTURE INTERRUPT  0 = INTERRUPT DISABLED (OFF)
;                1 = INTERRUPT ENABLED    (ON)
;
#define     ICR_INT_BIT    7,TCR   ;INTERRUPT MASK BIT FOR TIMER CAPTURE
#define     IRQ_BIT        1,OPTION ;
;---------------------------------------------------------------- region "ports"
;----------------------------------------------------------------
;----------------------------------------------------------------
#define     POWER_LED       7,APORT  ;(O) 1,CONTROLS XILINK RESET LINE
;#define    DONE_PIN        6,APORT  ;(I) 0,FOR MONITORING XILINK
#define     LD_SHIFT        5,APORT  ;(O) 0,LATCHS 8 BIT WORD TO G.A.
#define     E2_DATA_IN      4,APORT  ;(I)
#define     SPARE_LOS_LED   3,APORT  ;(O) 1,spare loss of signal
#define     E2_SELECT       2,APORT  ;(O)
;#define    spare_3         1,APORT  ;(O)
#define     MAINT_LED       1,APORT  ;(O) 0,maintenance LED
define     SENSE_PIN       0,APORT  ;(O) 1,power up diode define     DATA_SEL        7,BPORT  ;(O) 0,NOT A   B SELECT LINE
define     SER_DATA        6,BPORT  ;(O) 0,SERIAL DATA TO E^2 AND XILINK
#define     MANUAL_LBK_O_N  5,BPORT  ;(I) 1,manuel lpbk switch
```

```
#define    spare_5       4,BPORT ;(O)
#define    CLK_INHIBIT   3,BPORT ;(O) 1,esf clock inhibit
#define    LPBK_LED      2,BPORT ;(O) 1,lpbk led
#define    RLY_RESET     1,BPORT ;(O) 1,relay reset 0,relay set
#define    spare_6       0,BPORT ;(O)

#define    SER_CLK       7,CPORT ;(O) 1,SERIAL DATA CLK FOR E^2 & XILINK
#define    SWAP_PIN      6,CPORT ;(O) 0,dni exists, finish swap
#define    MAINT_RLY     5,CPORT ;(O) 0,maintenance relay
#define    BPV_IN        4,CPORT ;(I) 1,BPV
#define    X_RESET       3,CPORT ;(O) 1,CONTROLS XILINK RESET LINE
#define    RESTORE_SW    2,CPORT ;(I) 1,relay restore switch
#define    CCLK          1,CPORT ;(O) 1,CLK FOR DOWNLOADING AFTER RESET TO XILINKS
define    bit_193_MCSDATA 0,CPORT ;(O,I) 1,esf bit 193 and mcs file data ouput define    LOS_AIS_SW_N  4 DPORT ;(I) 1,AIS       0,NO RESPONSE
define    SF_ESF_SW     3,DPORT ;(I) 1,INBAND(SF)  0,ESF
;------------------------------------------------------------
#define    SENDING_ONES  0,FLAG1 ;Placeholder-no longer used
#define    OOS_LPBK      2,FLAG1 ;out of service lpbk = 1
#define    LOOP_FLAG_O   3,FLAG1 ;office lpbk 0=NONE  1=LOOPBACK ON
#define    COMP_FLAG     4,FLAG1 ;
#define    GOOD_PATH     5,FLAG1
#define    MAINT_FLASH   6,FLAG1 ;Maintenance mode LED flash
define    ARM_FLAG      7,FLAG1 define    sf_rcv_arming  0,SF_CURRENT_STATE
define    sf_rcv_lpdwn   1,SF_CURRENT_STATE define    timeout_flag  2,FLAG3
define    LP_2SEC_DET   6,FLAG3 ;Set when loopup code has been
                                 ;qualified for 3 seconds.
#define    STATE_CHANGE_O 0,FLAG4 ;flag for manuel lpbk buttom
#define    HARD_LOOP_O   2,FLAG4 ;1= in manuel lpbk toward office
#define    HARD_LOOP     4,FLAG4 ;1= manuel lpbk buttoms are pressed
#define    man_lpbk_O    5,FLAG4
define    LPBK_TO_DISABLE 7,FLAG4 define    LOS_AIS_SW_FLAG 0,FLAG5 ;1=LOS_AIS_SW is enable
define    LOS_SPARE_FLAG  1,FLAG5 ;1=LOSS of SIG from SPARE LINE
#define    SF_ESF_FLAG     2,FLAG5 ;1=INBAND DETECTION else ESF DL
#define    SF_LED          4,FLAG5 ;0=SF framed
#define    ESF_LED         5,FLAG5 ;0=ESF framed
```

```
        #define    SPAN_AIS         6,FLAG5      ;1=require to send AIS to DSX
        #define    DL_16BITS_FLAG   7,FLAG5      ;=1=check loop codes until 16 DL define    ERR_CNT0         7,GATE_ARRAY_REG2    ;error count of control byte to xilinx
        #define    ERR_CNT1         6,GATE_ARRAY_REG2    ;error count of control byte to xilinx
 5      #define    ERR_CNT2         5,GATE_ARRAY_REG2    ;error count of control byte to xilinx
        #define    ERR_CNT3         4,GATE_ARRAY_REG2    ;error count of control byte to xilinx
        #define    ERR_CNT4         3,GATE_ARRAY_REG2    ;error count of control byte to xilinx
        #define    CONT_C           2,GATE_ARRAY_REG2    ;C cross bit of control byte to xilinx
        #define    CONT_B           1,GATE_ARRAY_REG2    ;B FAC bit of control byte to xilinx
10      #define    CONT_A           0,GATE_ARRAY_REG2    ;A DSX bit of control byte to xilinx define    framer_side      0,power_byte    ;1 bit to xilinx
        #define    spare_cutoff     1,power_byte    ;1 bit to xilinx
        #define    oos_cutoff       2,power_byte    ;1 bit to xilinx 15      #define    main_ais_state           1,main_current_state
        #define    main_ais_override_state  0,main_current_state
        #define    main_in_lpbk_state       2,main_current_state define    ESF_ARM_DET      0,ESF_CURRENT_STATE  ;1=rcv esf lpup code

20      #define    ESF_DWN_DET      1,ESF_CURRENT_STATE  ;1=rcv esf lpdn code define    get_esf_lpbk     7,ESF_CURRENT_STATE  ;receive esf lpbk codes flag define    ignore_esf_lpup  0,ESF_IGNORE_STATE   ;1=ignore esf lpup code define    ignore_esf_lpdn  1,ESF_IGNORE_STATE   ;1=ignore esf lpdn code define    ignore_esf_code  7,ESF_IGNORE_STATE   ;1=ignore esf lpbk code

;-----------------------------------------------------------------
 3      ; MASK BIT FOR TIMER CAPTURE INTERRUPT  0 = INTERRUPT DISABLED (OFF)
        ;            1 = INTERRUPT ENABLED    (ON)
        ;
        #define    ICR_INT_BIT      7,TCR    ;INTERRUPT MASK BIT FOR TIMER CAPTURE
        #define    IRQ_BIT          1,OPTION ;
```

```
;------------------------------------------------------------- import  START e  x  p  o  r  t
        REPEAT_ADDRESS,CHK_SF_AUTO_SW,TIMEOUT_CODE,TIMEOUT_CODE_2

DUMMY1 EQU   START          ;THIS BRINGS IN MODULES FROM THE LIBRARY

REPEAT_ADDRESS       EQU  01      ;01 = REPEAT ADDRESS EVERY 20 SEC'S
        CHK_SF_AUTO_SW       EQU  00      ;01 = CHECK AND USE SF/AUTO SWITCH

TIMEOUT_CODE         EQU 11010101B    ;timeout override code
        TIMEOUT_CODE_2       EQU 11010110B    ;timeout override code list"off"
include     define.s
        list"on"

;********************************************************************
;           EEPROM ROUTINES
;******************************************************************** region "MAIN"

EXPORT    E2ERASE,E2SAVE,E2GET

IMPORT    E2ADDRESS,E2TEMP,SLOT_CNT,APORT,BPORT,CPORT,E2DATA
        IMPORT    HIGHEST_SLOT

;********************************************************************
;E2 COMMANDS -- COMMANDS INCLUDE AN INITIAL BIT AND START BIT

E2READ_CMD    EQU  000110B    ;READ COMMAND
        E2WEN_CMD     EQU  110010B    ;WRITE ENABLE
        E2WDS_CMD     EQU  000010B    ;WRITE DISABLE
        E2WRT_CMD     EQU  001010B    ;WRITE COMMAND
        E2CLR_CMD     EQU  010010B    ;CLEAR COMMAND

;********************************************************************
;THIS SECTION CONTAINS THE MAIN AND SUB ROUTINES FOR COMMUNICATIONS
;WITH THE SERIAL E2PROM
```

```
        ;THE ROUTINE USES THE FOLLOWING VARIABLES FLAGS AND COUNTERS
        ;          E2ADDRESS
        ;          E2DATA
        ;*********************************************************************
        ;
 5      E2READ:
            LDA   #E2READ_CMD          ;GET READ COMMAND
            BSR   E2COMMANDOUT         ;SEND READ COMMAND
            BSR   RDE2DATA             ;READ DATA
            RTS

10      E2WRITE:
            LDA   #E2WEN_CMD           ;SET WR ENABLE COMMAND
            BSR   E2COMMANDOUT         ;SEND COMMAND
            JSR   DISABLE_E2_DEVICE    ;DESELECT E2 DEVICE
            LDA   #E2WRT_CMD           ;GET WRITE COMMAND
15          BSR   E2COMMANDOUT         ;SEND WRITE COMMAND
            BSR   WRE2DATA             ;WRITE THE DATA
            LDA   #E2WDS_CMD           ;DISABLE WRITE MODE
            BSR   E2COMMANDOUT         ;SEND COMMAND
            JSR   DISABLE_E2_DEVICE    ;DESELECT E2 DEVICE
20          RTS

E2ERASE:
            BSR   E2CLEAR    ;CLEAR EEPROM
            CLR   E2ADDRESS
            LDA   #030D                ;SET EEPROM XFER ADDRESS TO 30
25          LDX   #0A5H                ;LOW BYTE
            JSR   E2SAVESUB  ;
            RTS

E2CLEAR:
            LDA   #E2WEN_CMD           ;SET WR ENABLE COMMAND
30          BSR   E2COMMANDOUT         ;SEND COMMAND
            JSR   DISABLE_E2_DEVICE    ;DESELECT E2 DEVICE
            LDA   #E2CLR_CMD           ;GET CHIP ERASE COMMAND
            BSR   E2COMMANDOUT         ;SEND ERASE COMMAND
            JSR   DISABLE_E2_DEVICE    ;DESELECT E2 DEVICE
35          BSR   E2DELAY              ;WAIT OUT ERASE TIME
            LDA   #E2WDS_CMD           ;DISABLE WRITE MODE
            BSR   E2COMMANDOUT         ;SEND COMMAND
            JSR   DISABLE_E2_DEVICE    ;DESELECT E2 DEVICE
            RTS
```

```
;*********************************************************************
;                  E2 SUBROUTINES
;*********************************************************************
;(A) = COMMAND WITH FIRST CLOCK BIT AND START BIT
E2COMMANDOUT:
        STA     E2TEMP            ;SAVE (A)
        JSR     ENABLE_E2_DEVICE  ;SELECT E2 DEVICE
        LDA     E2TEMP            ;GET (A)
        LDX     #6                ;NUMBER OF BITS TO SEND
        JSR     SERIALDATA        ;SEND DATA
        LDA     E2ADDRESS         ;GET DESIRED ADDRESS
        LDX     #4                ;NUMBER OF BITS
        JSR     SERIALDATA        ;SEND DATA
        RTS                       ;DONE

RDE2DATA:
        LDX     #08H              ;INCLUDES START BIT
        CLRA                      ;INITIAL VALUE
RDE2DATA1:
        JSR     SERIAL_CLK_TOGGLE ;SHIFT DATA IN
        STA     E2TEMP            ;SAVE ACC
        JSR     GET_E2_DATA       ;CHECK STATE OF E2 DATA
        RORA                      ;PUT BIT IN CARRY
        LDA     E2TEMP            ;GET BACK ACC
RDE2DATA2:
        RORA                      ;GET DATA IN ACC
        DEX                       ;DECREMENT COUNTER
        BNE     RDE2DATA1         ;LOOP NOT DONE
        STA     E2DATA + 1        ;LOW BYTE
        LDX     #08H              ;DO OTHER 8 BITS
        CLRA                      ;INITIAL VALUE
RDE2DATA3:
        JSR     SERIAL_CLK_TOGGLE ;SHIFT DATA IN
        STA     E2TEMP            ;SAVE ACC
        BSR     GET_E2_DATA       ;CHECK STATE OF E2 DATA
        RORA                      ;PUT BIT IN CARRY
        LDA     E2TEMP            ;GET BACK ACC
RDE2DATA4:
        RORA                      ;GET DATA IN ACC
        DEX                       ;DECREMENT COUNTER
        BNE     RDE2DATA3         ;LOOP NOT DONE
        STA     E2DATA            ;HIGH BYTE
        BSR     DISABLE_E2_DEVICE ;DESELECT E2 DEVICE
        RTS                       ;DONE WITH READ
```

```
        WRE2DATA:
            LDX    #08H                ;NUMBER OF BITS
            LDA    E2DATA + 1          ;LOW BYTE TO STORE
            BSR    SERIALDATA          ;SEND DATA
            LDX    #08H                ;NUMBER OF BITS
            LDA    E2DATA              ;HIGH BYTE TO STORE
            BSR    SERIALDATA          ;SEND DATA
            BSR    DISABLE_E2_DEVICE   ;DESELECT E2 DEVICE
            BSR    SERIAL_CLK_TOGGLE   ;ONE CLOCK CYCLE DESELECTED
                                       ;DELAY AFTER WRITE
        E2DELAY:
            LDA    #0AH                ;SET OUTER LOOP COUNT
        E2DELAY2:
            LDX    #0FFH               ;SET INNER LOOP COUNT
        E2DELAY3:
            DEX                        ;DECREMENT INNER COUNT
            BNE    E2DELAY3            ;INNER LOOP DONE?
            DECA                       ;DECREMENT OUTER LOOP
            BNE    E2DELAY2            ;OUTER LOOP DONE ?
            RTS

;*****************************************************************
;              E^2 SAVE ROUTINE
;*****************************************************************
        E2SAVE:
            BSR    E2CLEAR

CLR    E2ADDRESS
            LDA    SLOT_CNT    ;PUT SLOT COUNT IN EEPROM
            LDX    #0A5H       ;LOW BYTE
            BSR    E2SAVESUB   ;SVE ALIGNFLAG IN LOC #1

RTS

;*****************************************************************
        E2SAVESUB:
            STA    E2DATA              ;HIGH BYTE
            STX    E2DATA + 1          ;LOW BYTE
            JSR    E2WRITE
            ;INC   E2ADDRESS
            RTS
;*****************************************************************
;              E^2 RECALL ROUTINE
;*****************************************************************
```

```
E2GET:
        CLR    E2ADDRESS           ;START AT LOCATION 0

BSR    E2GET_SUB    ;GET COMPARATOR LEVEL
        CPX    #0A5H
        BNE    BAD_E2              ;TEST VALUE WRONG
        CMPA   #HIGHEST_SLOT
        BHI    BAD_E2              ;OUT OF RANGE

STA    SLOT_CNT
        BRA    GET_DONE
BAD_E2:
        LDA    #30D
        STA    SLOT_CNT
GET_DONE:
        RTS

;*********************************************************
E2GET_SUB:
        JSR    E2READ
        LDA    E2DATA              ;HIGH BYTE
        LDX    E2DATA + 1          ;LOW BYTE
        ;INC   E2ADDRESS
        RTS
;*********************************************************

ENABLE_E2_DEVICE:
        BSET   $E2_SELECT          ;SELECT E2 DEVICE
        RTS

DISABLE_E2_DEVICE:
        BCLR   $E2_SELECT          ;DESELECT E2 DEVICE
        RTS

GET_E2_DATA:                       ;CHECK STATE OF E2 DATA
        CLRA                       ;ASSUME ZERO
        BRSET  $E2_DATA_IN,BIT_HIGH ;DATA IS ONE
        RTS

BIT_HIGH:
        LDA    #0FFH
        RTS

SERIALDATA:
```

```
;       (A) = DATA TO OUTPUT ON SERIAL LINE
;       (X) = NUMBER OF BITS TO OUTPUT
        BCLR $SER_DATA ;ASSUME DATA LOW
        LSRA            ;CHECK BIT
        BCC  SDATALOW  ;BIT SHOULD BE LOW
        BSET $SER_DATA ;BIT SHOULD BE HIGH
SDATALOW:
        NOP             ;WAIT
        BSET $SER_CLK  ;TOGGLE CLOCK LINE
        NOP             ;WAIT
        NOP             ;WAIT
        NOP             ;WAIT
        BCLR $SER_CLK  ;PUT LINE IN OTHER STATE
        DEX             ;DECREMENT LOOP COUNTER
        BNE  SERIALDATA ;REPEAT
        RTS             ;DONE

SERIAL_CLK_TOGGLE:
        BSET $SER_CLK  ;TOGGLE CLOCK LINE
        NOP             ;WAIT
        NOP             ;WAIT
        NOP             ;WAIT
        BCLR $SER_CLK  ;PUT LINE IN OTHER STATE
        NOP             ;WAIT
        NOP             ;WAIT
        NOP             ;WAIT
        RTS

END import READ1,INT_TMR,IRQ,START region0 "ports"
;
;****************************************************************
;
;*              PORT-I/O-TIMER ASSIGNMENTS                      *
;****************************************************************
;
        export
APORT,BPORT,CPORT,DPORT,ADDR,BDDR,CDDR,TCR,TSR,OCHR,OCLR
        export CHR,CLR,PR,COPRR,COPCR,SCBRR,SCCR1,SCCR2,SCDR,SCSR
        export ICHR,ICLR
```

```
        APORT       DS  1       ;0 PORT A DATA REGISTER
        BPORT       DS  1       ;PORT B DATA REGISTER
        CPORT       DS  1       ;PORT C DATA REGISTER
        DPORT       DS  1       ;PORT D DATA REGISTER
        ADDR        DS  1       ;PORT A DATA DIRECTION REGISTER
        BDDR        DS  1       ;PORT B DATA DIRECTION REGISTER
        CDDR        DS  1       ;PORT C DATA DIRECTION REGISTER
                    DS  1       ;UNUSED
                    DS  1       ;UNUSED
                    DS  1       ;UNUSED
        SPCR        DS  1       ;A SERIAL PERIPHERAL CONTROL REGISTER
        SPSR        DS  1       ;SERIAL PERIPHERAL STATUS REGISTER
        SPDR        DS  1       ;SERIAL PERIPHERAL DATA I/O REGISTER
        SCBRR       DS  1       ;SERIAL COMM. BAUD RATE REGISTER
        SCCR1       DS  1       ;SERIAL COMM. CONTROL REGISTER 1
        SCCR2       DS  1       ;SERIAL COMM. CONTROL REGISTER 2
        SCSR        DS  1       ;10 SERIAL COMM. STATUS REGISTER
        SCDR        DS  1       ;SERIAL COMM. DATA REGISTER
        TCR         DS  1       ;TIMER CONTROL REGISTER
        TSR         DS  1       ;TIMER STATUS REGISTER
        ICHR        DS  1       ;INPUT CAPTURE HIGH REGISTER
        ICLR        DS  1       ;INPUT CAPTURE LOW REGISTER
        OCHR        DS  1       ;OUTPUT COMPARE HIGH REGISTER
        OCLR        DS  1       ;OUTPUT COMPARE LOW REGISTER
        CHR         DS  1       ;18 COUNTER HIGH REGISTER
        CLR         DS  1       ;COUNTER LOW REGISTER
        ACHR        DS  1       ;ALTERNATE COUNTER HIGH REGISTER
        ACLR        DS  1       ;ALTERNATE COUNTER LOW REGISTER
        PR          DS  1       ;PROGRAM REGISTER
        COPRR       DS  1       ;COP RESET REGISTER
        COPCR       DS  1       ;COP CONTROL REGISTER

;****************************************************************
;*              TIMER LABLES                                    *
;****************************************************************
;****************************************************************
;*              1MS TIMERS                                      *
;****************************************************************
        region0 "ramdata"

export TMR1,TMR2,TMR3,TMR4
        export TIMEOUT_H,TIMEOUT_L,MS_COUNTER

TMR1        DS  1       ;
```

```
       TMR2              DS     1      ;
       TMR3              DS     1      ;
       TMR4              DS     1      ;
       MS_COUNTER        DS     1
       TIMEOUT_H         DS     1      ;Arming code fail-safe timeout
       TIMEOUT_L         DS     1      ;Arming code fail-safe timeout
;***********************************************************************
;*                      100MS TIMERS                           *
;***********************************************************************
;***********************************************************************
;*                      1 MIN. TIMER                           *
;***********************************************************************
;***********************************************************************
;*                      FLAGS                                  *
;***********************************************************************
       region0 "ramdata"
       export FLAG1,FLAG3,FLAG4,FLAG5
       export main_current_state
       export SF_CURRENT_STATE
       export ESF_CURRENT_STATE,ESF_IGNORE_STATE FLAG1             DS    1
       SF_CURRENT_STATE  DS    1
       FLAG3             DS    1
       FLAG4      DS     1
       FLAG5      DS     1
       main_current_state DS    1
       ESF_CURRENT_STATE DS    1
       ESF_IGNORE_STATE  DS    1
;***********************************************************************
;*                      BUFFERS AND POINTERS                   *
;***********************************************************************
       export OCRTEMPLO,SLOT_CNT,UTMR,E2TEMP,E2DATA,E2ADDRESS
       export ERROR_CNT,X_CNT,X_BYTE,BLK_CNT
       export SCAN_TMR,CCU_RESPONSE,CCU_ERR_CNT
       export DET_PATTERN,DET_PATTERN_2,NONERR_CNT
       export xmt_xilinx_buffer,power_byte,GATE_ARRAY_REG2,SHFT_CNT
       export DL_DATA_U,DL_DATA_L,INT_CNT,DEBOUNCE_CNT
       export px_count,qualify_time,temp_buffer px_count          DS    1
       qualify_time      DS    1
       ;DL_CNT            DS    1
```

```
NONERR_CNT        DS    1
SHFT_CNT    DS    1
XTEMP0        DS 1     ;TEMP BUFFER FOR X REG DURING PROCESS
XTEMP1        DS 1     ;TEMP BUFFER FOR X REG DURING DELAY
XTEMP2        DS 1     ;TEMP BUFFER FOR X REG DURING DELAY2
TIMERCT       DS     1    ;
TIMERADD      DS     1    ;TIMER ADDRESS POINTER
TIMERADD2     DS     1    ;TMP BUF FOR TIMERADD DURING INTERRUPT
OCRTEMPLO     DS     1    ;TMP BUF FOR TIMERADD FOR INTER.
PREVIOUS      DS    1
TMR_U         DS    1
TMR_L         DS    1
INT_CNT       DS    1
X_BYTE        DS    1     ;TMP STORAGE FOR XILINK DATA
X_CNT         DS    1     ;COUNTER USED IN XILINK.S
ERROR_CNT     DS    1
SEARCH_TMR    DS    1
BIT_LEN       DS    1
BLK_CNT       DS    1
DET_PATTERN   DS    1
DET_PATTERN_2 DS    1
GEN_PATTERN   DS    1
SCAN_TMR DS   1
UTMR       DS 1
ERR_DATA_U    DS    1
ERR_DATA_L    DS    1
PRE_ICHR  DS  1
PRE_ICLR  DS  1
RST_ICHR  DS  1
RST_ICLR  DS  1
DL_DATA_U     DS    1
DL_DATA_L     DS    1
CNT_U         DS    1
CNT_L         DS    1
GATE_ARRAY_REG       DS    7
xmt_xilinx_buffer    DS    4
power_byte           equ   xmt_xilinx_buffer
GATE_ARRAY_REG2      equ   xmt_xilinx_buffer+1
RPTR_ADDR            DS    1
temp_buffer     DS    1
bit_error_timer       DS    1
esf_debounce_count    DS 1      ;debounce counter for esf lpbk code
ESF_CURRENT_CODE      DS 1          ;storage for esf current rcvd code
DL_BYTE_COUNTER       DS 1      ;ESF DL BYTE COUNTER
```

```
        DL_BIT_COUNTER      DS 1        ;ESF DL bit COUNTER
        SLOT_CNT            DS 1
        DEBOUNCE_CNT        DS 1
        CCU_ERR_CNT         DS 1
5       CCU_RESPONSE        DS 1
        E2TEMP              DS 1
        E2DATA              DS 2
        E2ADDRESS           DS 1 export  esf_debounce_count,ESF_CURRENT_CODE,DL_BYTE_COUNTER
10      export  DL_BIT_COUNTER
;*****************************************************************
;*                  RAM1 DATA                                    *
;***************************************************************** region0 "ram1"

15      ;   export E2_REG

;E2_REG         DS      31

;*****************************************************************
;*                  RAM2 DATA                                    *
;*****************************************************************

20      region"ram2"

;   export E2_SHADOW

;E2_SHADOW      DS      31
;*****************************************************************
;*                  SET TIMER CONTSANTS                          *
25      ;*****************************************************************
        region"MAIN"

export LOWTIMERVAL,HIGHTIMERVAL,OPTION
        export RAM_START,RAM_END,TCR_MASK,NONERR_THRES
        export ESF_HEADER,ESF_ARM1_CODE,ESF_ARM2_CODE
30      export ESF_DWN1_CODE,ESF_DWN2_CODE,QUERY_CODE
        export CNT_DWN_2SEC,RESTORE_CODE,RESTORE_CODE_2
        export ARM_CODE,ARM_CODE_2,LP_DWN_CODE,LP_DWN_CODE_2
        export LP_UP_CODE,LP_UP_CODE_2,LOS_CODE,LOS_CODE_2
        export AIS_TOG_CODE,AIS_TOG_CODE_2
```

```
        RESOL100      EQU   64H          ;CONSTANT FOR 100 RESOLUTION TIMERS
        RESOL10       EQU   0AH          ;CONSTANT FOR 10 RESOLUTION TIMERS
        RESOL40       EQU   28H          ;CONSTANT FOR 40 RESOLUTION TIMERS
        TCV           EQU   07H          ;TIMER CONTROL REG. CONFIG. VAULE
        TSV           EQU   07H          ;TIMER DATA REGISTER START VAULE
        MOR           EQU   10H          ;INTERRUPT MASK VALUE
        LOWTIMERVAL   EQU   064H         ;064h  ;LOW VALUE FOR INT. COUNTER
        HIGHTIMERVAL  EQU   000H         ;000h  ;HIGH VALUE    0FBHEQU251EQU1  MS
        EMULATOR exportINT_CNT_value,INT_CNT_value_2,ERROR_CNT_value,ERROR_CNT_value_2
        export TMR1_value,TMR2_value,TMR3_value,TMR4_value
        export LOOP_TO_TIME_H,LOOP_TO_TIME_L TMR1_value    EQU   04H          ;1 ms timer
        TMR2_value    EQU   0C7H         ;199d, 200 ms timer
        TMR3_value    EQU   02D          ;.4s timer
        TMR4_value    EQU   050D         ;10s timer INT_CNT_value     EQU   10D
        INT_CNT_value_2   EQU   008D     ;for scan routine
        ERROR_CNT_value   EQU   03D
        ERROR_CNT_value_2 EQU   04D      ;for scan routine ;LOOP_TO_TIME_H EQU 00H          ; 20 mins(+- 10s) loop timeout time in minutes
        ;LOOP_TO_TIME_L EQU 0121D        ; 20 mins loop timeout time in minutes
        LOOP_TO_TIME_H  EQU  001H        ; 60 mins(+- 10s) loop timeout time in minutes
        LOOP_TO_TIME_L  EQU  069H        ; 60 mins loop timeout time in minutes
        ARM_TO_TIME_H   EQU  002H        ; 2 hrs(+- 10s) Arm timeout time in minutes
        ARM_TO_TIME_L   EQU  0D1H        ; 2 hrs Arm timeout time in minutes
        CNT_DWN_2SEC    EQU  10D         ; Value to compare with SCAN_TMR to see if
                                         ; 2 seconds have passed.

export TIME_4SEC,TIME_3SEC,TIME_2SEC,TIME_1SEC
        export TIME_0SEC,TIME_150MS,TIME_20SEC,TIME_15SEC
        export TIME_5SEC TIME_20SEC    EQU   100D         ;20 seconds counter
        TIME_15SEC    EQU   075D         ;15 seconds counter
        TIME_5SEC     EQU   025D         ;5 seconds counter
        TIME_4SEC     EQU   020D         ;4 seconds counter
        TIME_3SEC     EQU   015D         ;3 seconds counter
        TIME_2SEC     EQU   010D         ;2 seconds counter
```

```
        TIME_1SEC      EQU  05D     ;1 seconds counter
        TIME_400MS     EQU  02D     ;400 mseconds counter
        TIME_46000MS   EQU  02D     ;46000 mseconds counter
        TIME_0SEC      EQU  0D      ;0 seconds counter
5       TIME_150MS     EQU  75D     ;150 mseconds counter RAM_START      EQU  050H
        RAM_END        EQU  0BFH
        TCR_MASK       EQU  040H ;THIS VALUE DISABLES THE INTERRUPTS
                                 ;AND SETS TCAP PIN FOR NEG. GOING EDGE

10      NONERR_THRES EQU  006D export AIS_to_both_value,AIS_to_fac_value,AIS_to_dsx_value
            export       normal_control_value,LIS_to_dsx_value,LIS_to_fac_value
            export lpbk_no_LIS_value ESF_HEADER          EQU  11111111B   ;ESF message header
15      ESF_ARM1_CODE       EQU  00010010B   ;ESF universal arming code
        ESF_ARM2_CODE       EQU  00111100B   ;ESF repeater only arming code
        ESF_DWN1_CODE       EQU  00100100B   ;ESF universal loopdown code
        ESF_DWN2_CODE       EQU  00000110B   ;ESF repeater only loopdown code ;*********** 16 bit xilinx code ******
        ;
20      AIS_to_both_value    EQU 11111011B    ;send AIS to both
        AIS_to_fac_value     EQU 11111010B    ;send AIS to fac
        AIS_to_dsx_value     EQU 11111001B    ;send AIS to DSX
        normal_control_value EQU 11111000B
        LIS_to_dsx_value     EQU 11111001B    ;send LIS to office
25      LIS_to_fac_value     EQU 11111010B    ;send LIS to fac
        lpbk_no_LIS_value    EQU 11111000B    ;lpbk with no LIS to fac(los lpbk)

LP_UP_CODE           EQU 11000110B    ;lpup code 1 for 16 bits
        LP_UP_CODE_2         EQU 00110001B    ;lpup code 2 for 16 bits
        LP_DWN_CODE          EQU 11100111B    ;all lpdn
30      LP_DWN_CODE_2        EQU 00111001B    ;all lpdn
        ARM_CODE             EQU 11000100B    ;arming code 1 for 16 bits
        ARM_CODE_2           EQU 01011101B    ;arming code 2 for 16 bits
        RESTORE_CODE         EQU 11000100B    ;restore code
        RESTORE_CODE_2       EQU 01011110B    ;restore code
35      AIS_TOG_CODE         EQU 11000100B    ;ais toggle code
```

```
         AIS_TOG_CODE_2        EQU 01100001B    ;ais toggle code
         LOS_CODE              EQU 00000000B    ;loss of signal code 1 for 16 bits
         LOS_CODE_2            EQU 00000000B    ;loss of signal code 2 for 16 bits
         QUERY_CODE            EQU 11010101B    ;query code 5        export    main_normal_state_value,main_in_maint_value
         export    main_in_lpbk_value
         export    lpup_value,lpdn_value
         export    DL_BYTE_COUNT main_normal_state_value EQU 00h    ;normal state value in main routine
10       main_in_lpbk_value      EQU 01h    ;in_lpbk state value in main routine
         main_in_maint_value     EQU 02h    ;in_maint state value in main routine lpup_value    EQU    81h            ;indicate esf lpup code rcvd. set bit 0 of
         SF/ESF_CURRENT_STATE
         lpdn_value    EQU    82h            ;indicate esf lpdn code rcvd. set bit 1 of
15       SF/ESF_CURRENT_STATE ;ignore_lpup_value    EQU    81h    ;ignore lpup code rcvd. set bit 0/7 of
         SF/ESF_IGNORE_STATE
         ;ignore_lpdn_value    EQU    82h    ;ignore lpdn code rcvd. set bit 1/7 of
         SF/ESF_IGNORE_STATE

20       DL_BYTE_COUNT         EQU 003H      ;DL BYTE COUNTER RELOAD VAULE

;***************************************************************
         ;*        DEFINE INTERRUPTS VECTORS                            *
         ;*************************************************************** region "opt_vector"

25       OPTION DS  1 region "vectors"

define    UNUSED  2

DW    UNUSED
30            DW    READ1              ;SERIAL COMMUNICATIONS    (1FF6)
              DW    INT_TMR   ;TIMER INTURRUPT VECTOR     (1FF8)
              DW    IRQ       ;IRQ INTERRUPT VECTOR       (1FFA)
              DW    UNUSED
```

```
                DW      START              ;RESET INTERRUPT VECTOR    (1FFE)

list"off"
                #include    define.s
                #include    esf_def.h
5                       list"on"

export frame_seek_state
                        export state_variable region0 "ramdata"

slip_variable   DS      1
10              state_variable  DS      5               ;state variable in state_machine_sub
                state_1         equ     state_variable+1   ;state variable in start_state_machine
                state_2         equ     state_variable+2   ;state variable in start_state_machine
                state_3         equ     state_variable+3   ;state variable in start_state_machine
                state_4         equ     state_variable+4   ;state variable in start_state_machine
15              frame_seek_state DS     1
                ;esf_data       DS      5
                esf_data        DS      1
                sf_data_1       DS      1
                sf_data_2       DS      1
20              sf_data_3       equ     esf_data
                sf_frame_variable   DS      1           ;if 4 frame bit are clear, the data is in SF framing
                SF_state_variable   DS      1

;----------------------------------------------------------------
                ;Variable storage assigment when the unit is in  esf mode
25              ;----------------------------------------------------------------
                ;
                ;
                ;                               ;R0= state_variable
                ;                               ;R1= esf_data
                prev_bit_error      EQU    state_1      ;R2= 0 if the previous bit is not in error
30              prev_frame_error    EQU    state_2      ;R3= 0 if the last frame byte is not in error
                frame_error_count   EQU    state_3      ;R4= error counter for every frame byte
                frame_bit_count     EQU    state_4      ;R5= frame bit counter
                ;                                       ;R6= frame_seek_state frame_error_count_value     EQU 04H
35              frame_bit_count_value       EQU 06H
```

```
      #define    SLIP    0,slip_variable       ;slip bit for rountine state_machine_sub
      #define    slip_1  1,slip_variable       ;slip bit for rountine start_state_machine
      #define    slip_2  2,slip_variable       ;slip bit for rountine start_state_machine
      #define    slip_3  3,slip_variable       ;slip bit for rountine start_state_machine
5     #define    slip_4  4,slip_variable       ;slip bit for rountine start_state_machine
      #define    esf_data_next_bit 2,esf_data  ;new esf bit position
      #define    sf_data_next_bit 0,sf_data_3  ;new sf bit position define    sf_frame_1_bit  1,sf_frame_variable   ;frame bit 1 for SF framing 111111
      #define    sf_frame_2_bit  2,sf_frame_variable   ;frame bit 2 for SF framing 110110
10    #define    sf_frame_3_bit  3,sf_frame_variable   ;frame bit 3 for SF framing 000000
      #define    sf_frame_4_bit  4,sf_frame_variable   ;frame bit 4 for SF framing 100100 define    SF_frame_1_value 46     ;index value for starting state of frame 1
      #define    SF_frame_2_value 52     ;index value for starting state of frame 1
      #define    SF_frame_3_value 43     ;index value for starting state of frame 1
15    #define    SF_frame_4_value 49     ;index value for starting state of frame 1

ESF_FRAME_VALUE EQU   094H    ;100101
      SF_FRAME_VALUE_1 EQU  0E4H    ;1110 0100 0110 1110 0100 0110
      SF_FRAME_VALUE_2 EQU  06EH    ;0110 1110
      SF_FRAME_VALUE_3 EQU  046H    ;0100 0110
20    invalid_state_value EQU 0FFh  ;indicate invalid frame byte received for the state region "MAIN"

import DL_DATA_L
      import DL_DATA_U good_state:  #macro
25        CLR   state_variable   ;initial state for esf mode endm slip_bit:  #macro

LDX   frame_seek_state    ;
          LDA   clear_slip_bit_table,X
30        AND   slip_variable
          STA   slip_variable       ;clear slip bit
```

```
                #endm export IRQ
        ;       export ESF_FRAMING
        ;
5       ;_____
        ; start of state machine
        ;
        ;
        ;_____
        IRQ:
10      ESF_FRAMING:

;       BRSET ESF_FRAME_UP_N,TRY_FRAME_UP   ;if not in esf mode,jmp
                BRCLR ESF_FRAME_UP_N,esf_was_in_frame   ;if not in esf mode,jmp
                BRCLR SF_FRAME_UP_N,sf_was_in_frame   ;if not in esf mode,jmp
                JMP   TRY_FRAME_UP 15      esf_was_in_frame:
                LDX   state_variable
                LSLX                    ;3 multiply reg X by 2
                JMP   esf_state_table,X   ;4 esf_state_table:            ;3
20              BRA   esf_state_default  ;0 ,initial state
                BRA   esf_state_DLH        ;2 ,DL high byte
                BRA   esf_state_CRC        ;4 ,CRC byte
                BRA   esf_state_DLL        ;6 ,DL low byte
                BRA   esf_state_FRAME    ;8 ,FRMAE byte 25      sf_was_in_frame:
                TST   state_variable
                BEQ   sf_state_default   ;
                BRA   sf_state_FRAME     ;

sf_state_default:
30              LDA   #SF_FRAME_VALUE_1
                STA   sf_data_1               ;frame byte
                LDA   #SF_FRAME_VALUE_2
                STA   sf_data_2               ;frame byte
                LDA   #SF_FRAME_VALUE_3
35              STA   sf_data_3               ;frame byte
                BRA   state_default
```

```
        esf_state_default:
                LDA     #ESF_FRAME_VALUE
                STA     esf_data                ;frame byte
        state_default:
5               LDA     #00h
                STA     DL_DATA_L               ;store into DL_DATA_L
                STA     DL_DATA_U               ;store into DL_DATA_H
                STA     prev_bit_error          ;reset error flag
                STA     prev_frame_error        ;reset error flag
10              LDA     #frame_error_count_value
                STA     frame_error_count  ;restore frame error count
                LDA     #frame_bit_count_value
                STA     frame_error_count  ;restore frame error count
                LDA     #02h
15              STA     state_variable
                JMP     ESF_FRAMING_EXIT esf_state_DLH:                          ;check data link bytes
        esf_state_DLL:                          ;check data link bytes
                JSR     ESF_LOOP_DETECT         ;check esf loop code
20              INC     state_variable          ;update state variable
                JMP     ESF_FRAMING_EXIT esf_state_CRC:
                INC     state_variable          ;update state variable
                JMP     ESF_FRAMING_EXIT 25      esf_state_FRAME:
                BRCLR   bit_193,esf_bit_193_0   ;5
                ROL     esf_data                ;update the current frame byte
                BCS     esf_in_frame_bit_1      ;check to see if the new bit is correct
                BCLR    esf_data_next_bit
30              BRA     lost_frame              ;the bit is not correct
        esf_bit_193_0:
                ROL     esf_data                ;update the current frame byte
                BCC     esf_in_frame_bit_0      ;check to see if the new bit is correct
                BSET    esf_data_next_bit
35              BRA     lost_frame esf_in_frame_bit_1:
                BSET    esf_data_next_bit       ;store new bit to the next position
                BRA     bit_in_frame
        esf_in_frame_bit_0:
```

```
            BCLR  esf_data_next_bit        ;store new bit to the next position
            BRA   bit_in_frame sf_state_FRAME:
            BRCLR bit_193,sf_bit_193_0     ;5
  5         ROL   sf_data_3                ;update the current frame byte
            ROL   sf_data_2                ;update the current frame byte
            ROL   sf_data_1                ;update the current frame byte
            BCS   sf_in_frame_bit_1        ;check to see if the new bit is correct
            BCLR  sf_data_next_bit
 10         BRA   lost_frame               ;the bit is not correct
       sf_bit_193_0:
            ROL   sf_data_3                ;update the current frame byte
            ROL   sf_data_2                ;update the current frame byte
            ROL   sf_data_1                ;update the current frame byte
 15         BCC   sf_in_frame_bit_0        ;check to see if the new bit is correct
            BSET  sf_data_next_bit
            BRA   lost_frame sf_in_frame_bit_1:
            BSET  sf_data_next_bit         ;store new bit to the next position
 20         BRA   bit_in_frame
       sf_in_frame_bit_0:
            BCLR  sf_data_next_bit         ;store new bit to the next position
            BRA   bit_in_frame lost_frame:
 25         LDA   prev_bit_error
            BNE   lost_frame_slip          ;first time of lost bit? if no,jmp
            INC   prev_bit_error           ;yes,first time
            LDA   frame_error_count        ;test frame_error
            CMP   #frame_error_count_value
 30         BNE   not_first_frame_in_error ;if not first frame in error,jmp
            LDA   #frame_bit_count_value-1 ;otherwise, start new frame byte
            STA   frame_bit_count
            BRA   bit_error_in_frame not_first_frame_in_error:
 35         DEC   frame_bit_count          ;
            TST   frame_bit_count          ;jmp if not new frame byte
            BNE   bit_error_in_frame
```

```
frame_byte_in_error:
        DEC   frame_error_count
        TST   frame_error_count
        BNE   frame_error_in_frame       ;4 consecutive frame bytes in error ?
lost_frame_slip:
        BSET  ESF_FRAME_UP_N              ;turn off esf led
        BSET  SF_FRAME_UP_N               ;turn off sf led
        ;BSET ESF_SF_LED_N                ;turn off esf/sf led
        CLR   frame_seek_state            ;set to the initial state for esf framing routine
        JMP   ESF_FRAMING_EXIT bit_error_in_frame:
        inc   prev_frame_error            ;last frame byte is in error
        BRA   in_frame frame_error_in_frame:
        LDA   #frame_bit_count_value
        STA   frame_bit_count
        CLR   prev_frame_error            ;clear flag for last frame byte in error
        BRA   in_frame bit_in_frame:
        CLR   prev_bit_error
        DEC   frame_bit_count             ;
        TST   frame_bit_count
        BNE   in_frame                    ;jmp if new frame byte is not ready
        LDA   #frame_bit_count_value
        STA   frame_bit_count             ;restore frame bit counter
        TST   prev_frame_error
        BNE   frame_byte_in_error         ;jmp if previous frame is in error
        LDA   #frame_error_count_value
        STA   frame_error_count           ;restore frame error count
in_frame:
        LDA   #01h
        STA   state_variable              ;update state_variable
        JMP   ESF_FRAMING_EXIT TRY_FRAME_UP:
        LDX   frame_seek_state            ;3 load frame_seek_state
        LSLX                              ;3 multiply reg X by 2
        JMP   seek_state_table,X          ;4
```

```
seek_state_table:                    ;3
        BRA     seek_state_default   ;0 ,frame_seek_state = 0
        BRA     seek_state_1         ;2 ,frame_seek_state = 1
        BRA     seek_state_2         ;4 ,frame_seek_state = 2
        BRA     seek_state_3         ;6 ,frame_seek_state = 3
        BRA     seek_state_4         ;8 ,frame_seek_state = 4 seek_state_default:                  ;initial esf framing routine
;       BSET    CLK_INHIBIT          ;5
;       BCLR    CLK_INHIBIT          ;5
        LDA     #1EH                 ;2
        STA     slip_variable        ;4
        STA     sf_frame_variable    ;4
        LDA     #00H                 ;2
        STA     state_1
        STA     state_2
        STA     state_3
        STA     state_4
        INC     frame_seek_state
        JMP     ESF_FRAMING_EXIT seek_state_1:
        BRSET   slip_1,go_state_machine
        INC     frame_seek_state     ;5
        BRA     ESF_FRAMING_EXIT
seek_state_2:
        BRSET   slip_2,go_state_machine
        INC     frame_seek_state     ;5
        BRA     ESF_FRAMING_EXIT
seek_state_3:
        BRSET   slip_3,go_state_machine
        INC     frame_seek_state     ;5
        BRA     ESF_FRAMING_EXIT
go_state_machine:
        JSR     state_machine_sub    ;6   call state machine
        INC     frame_seek_state     ;5
        BRA     chk_slip_variable    ;3
seek_state_4:
        BRCLR   slip_4,update_frame_seek
        JSR     state_machine_sub    ;6   call state machine
update_frame_seek:
        LDA     #01d
        STA     frame_seek_state
```

```
chk_slip_variable:
        LDA    slip_variable      ;3   check slip bits
        BNE    ESF_FRAMING_EXIT   ;3   jmp if one of the state is OK
        BSET   ESF_FRAME_UP_N     ;5   not in esf mode any more
        CLR    frame_seek_state   ;5   ready to slip bit
        BSET   CLK_INHIBIT        ;5
        BCLR   CLK_INHIBIT        ;5

ESF_FRAMING_EXIT:
        RTI

;_____
;
;State machine for ESF framing
;50
;_____ state_machine_sub:
        LDX    frame_seek_state
        BRCLR  bit_193,bit_193_0  ;5
bit_193_1:
        LDX    state_variable,X   ;3 load index state_variable
        LSLX                      ;3 multiply reg X by 2
        JMP    switch_table_1,X   ;load switch_table_1
bit_193_0:
        LDX    state_variable,X   ;3 load index state_variable
        LSLX                      ;3 multiply reg X by 2
        JMP    switch_table_0,X   ;4 load switch_table_0 switch_table_0:                   ;3 bit 193 = 0
        BRA    state_var_0_0      ;state_variable = 0
        BRA    state_var_0_1      ;state_variable = 1
        BRA    state_var_0_2      ;state_variable = 2
        BRA    state_var_0_3      ;state_variable = 3
        BRA    state_var_0_4      ;state_variable = 4
        BRA    state_var_0_5      ;state_variable = 5
        BRA    state_var_0_6      ;state_variable = 6
        BRA    state_var_0_7      ;state_variable = 7
        BRA    state_var_0_8      ;state_variable = 8
        BRA    state_var_0_9      ;state_variable = 9
        BRA    state_var_0_10     ;state_variable = 10
        BRA    state_var_0_11     ;state_variable = 11
        BRA    state_var_0_12     ;state_variable = 12
```

```
BRA     state_var_0_13      ;state_variable = 13
BRA     state_var_0_14      ;state_variable = 14
BRA     state_var_0_15      ;state_variable = 15
BRA     state_var_0_16      ;state_variable = 16
BRA     state_var_0_17      ;state_variable = 17
BRA     state_var_0_18      ;state_variable = 18
BRA     state_var_0_19      ;state_variable = 19
BRA     state_var_0_20      ;state_variable = 20
BRA     state_var_0_21      ;state_variable = 21
BRA     state_var_0_22      ;state_variable = 22
BRA     state_var_0_23      ;state_variable = 23
BRA     state_var_0_24      ;state_variable = 24
BRA     state_var_0_25      ;state_variable = 25
BRA     state_var_0_26      ;state_variable = 26
BRA     state_var_0_27      ;state_variable = 27
BRA     state_var_0_28      ;state_variable = 28
BRA     state_var_0_29      ;state_variable = 29
BRA     state_var_0_30      ;state_variable = 30

BRA     state_var_0_19      ;state_variable = 31
BRA     state_var_0_20      ;state_variable = 32
BRA     state_var_0_21      ;state_variable = 33
BRA     state_var_0_22      ;state_variable = 34
BRA     state_var_0_23      ;state_variable = 35
BRA     state_var_0_24      ;state_variable = 36

BRA     state_var_0_31      ;state_variable = 37
BRA     state_var_0_32      ;state_variable = 38
BRA     state_var_0_33      ;state_variable = 39
BRA     state_var_0_34      ;state_variable = 40
BRA     state_var_0_35      ;state_variable = 41
BRA     state_var_0_36      ;state_variable = 42

BRA     sf_state_var_0_1    ;state_variable = 43    ;for frame 3 000000
BRA     sf_state_var_0_2    ;state_variable = 44
BRA     sf_state_var_0_3    ;state_variable = 45

BRA     sf_state_var_0_5    ;state_variable = 46    ;for frame 1 111111
BRA     sf_state_var_0_6    ;state_variable = 47
BRA     sf_state_var_0_7    ;state_variable = 48

BRA     sf_state_var_0_9    ;state_variable = 49    ;for frame 4 100100
BRA     sf_state_var_0_10   ;state_variable = 50
BRA     sf_state_var_0_11   ;state_variable = 51
```

```
        BRA    sf_state_var_0_13    ;state_variable = 52    ;for frame 2 110110
        BRA    sf_state_var_0_14    ;state_variable = 53
        BRA    sf_state_var_0_15    ;state_variable = 54

BRA    sf_state_var_0_16    ;state_variable = 55
        BRA    sf_state_var_0_17    ;state_variable = 56
        BRA    sf_state_var_0_18    ;state_variable = 57
        BRA    sf_state_var_0_19    ;state_variable = 58

;*********************************************
;
;The following statements are reflected to the
;state machine for ESF FRAMING and the input
;bit equals 0
;
;********************************************* state_var_0_0:
        BRA    inc_state_var_0      ;go to next state
state_var_0_1:
        LDA    #03d
        BRA    store_state_var_0
state_var_0_2:
state_var_0_4:
        LDA    #05d                 ;2
        BRA    store_state_var_0 state_var_0_3:
        BRA    set_sf_frame_3
state_var_0_5:
        LDA    #07d
        BRA    store_state_var_0
state_var_0_6:
        LDA    #09d
        BRA    store_state_var_0
state_var_0_7:
state_var_0_8:
state_var_0_12:
state_var_0_16:
state_var_0_17:
state_var_0_18:
state_var_0_21:
state_var_0_27:
```

```
state_var_0_33:

state_var_0_23:
state_var_0_29:
state_var_0_35:

state_var_0_24:
state_var_0_30:
state_var_0_36:
        BRA   store_state_var_slip_0 state_var_0_9:
        LDA   #12d
        BRA   store_state_var_0
state_var_0_10:
        LDA   #13d
        BRA   store_state_var_0
state_var_0_11:
        LDA   #14d
        BRA   store_state_var_0
state_var_0_13:
        BRA   set_sf_frame_4
state_var_0_14:
        LDA   #017d
        BRA   store_state_var_0
state_var_0_15:
        LDA   #018d
        BRA   store_state_var_0 state_var_0_19:
state_var_0_20:
state_var_0_22:
state_var_0_25:
state_var_0_26:
state_var_0_28:
state_var_0_31:
state_var_0_32:
state_var_0_34:
sf_state_var_0_1:
sf_state_var_0_2:
sf_state_var_0_10:
sf_state_var_0_17:
        BRA   inc_state_var_0          ;go to next state
```

```
        set_sf_frame_3:
            BRSET  sf_frame_2_bit,store_state_var_slip_0   ;jmp if not ready for sf framing
            LDA    #SF_frame_3_value                       ;set to next state value
            BRA    store_state_var_0

5      set_sf_frame_4:
            BRSET  sf_frame_2_bit,store_state_var_slip_0   ;jmp if not ready for sf framing
            LDA    #SF_frame_4_value                       ;set to next state value
            BRA    store_state_var_0 sf_state_var_0_3:
10          BRSET  sf_frame_2_bit,store_state_var_slip_0   ;jmp if not for sf framing
            LDX    SF_state_variable                       ;Is this a correct frame byte?
            LDA    set_sf_frame_3_table,X    ;6
            CMP    frame_seek_state
            BNE    store_state_var_slip_0                  ;if not a right frame byte,jmp
15          BCLR   sf_frame_3_bit                          ;otherwise set frame bit skip_set_frame_3_bit:
            LDA    #SF_frame_3_value                       ;set to next state value
            BRA    store_state_var_0 sf_state_var_0_5:
20      sf_state_var_0_6:
        sf_state_var_0_7:
            BSET   sf_frame_1_bit          ;111111 not detected
            BRA    store_state_var_slip_0 sf_state_var_0_9:
25          BSET   sf_frame_4_bit          ;100100 not detected
            BRA    store_state_var_slip_0 sf_state_var_0_13:
        sf_state_var_0_15:
        sf_state_var_0_16:
30      sf_state_var_0_18:
        sf_state_var_0_19:
            BSET   sf_frame_2_bit          ;not in SF framing any more
            BRA    store_state_var_slip_0 sf_state_var_0_11:
35          BRSET  sf_frame_2_bit,store_state_var_slip_0   ;jmp if not for sf framing
```

```
                LDX   SF_state_variable              ;Is this a correct frame byte?
                LDA   set_sf_frame_4_table,X   ;6
                CMP   frame_seek_state
                BNE   store_state_var_slip_0         ;if not a right frame byte,jmp
5               BCLR  sf_frame_4_bit                 ;otherwise set frame bit skip_set_frame_4_bit:
                LDA   #SF_frame_4_value              ;set to next state value
                BRA   store_state_var_0

10      sf_state_var_0_14:
                LDA   #1EH             ;2
                STA   slip_variable    ;4
                STA   sf_frame_variable         ;4
                BCLR  sf_frame_2_bit                 ;start scan for sf framing
15              LDA   frame_seek_state               ;
                STA   SF_state_variable
                BRA   inc_state_var_0                ;go to next state inc_state_var_0:
                LDX   frame_seek_state
20              INC   state_variable,X
                RTS store_state_var_0:
                LDX   frame_seek_state
                STA   state_variable,X
25              RTS store_state_var_slip_0:
        ;*      LDA   #invalid_state_value
                slip_bit
                RTS 30      state_machine_0_EXIT:
                RTS

;*********************************************
```

```
switch_table_1:                         ;bit 193 = 1
        BRA     state_var_1_0           ;state_variable = 0
        BRA     state_var_1_1           ;state_variable = 1
        BRA     state_var_1_2           ;state_variable = 2
        BRA     state_var_1_3           ;state_variable = 3
        BRA     state_var_1_4           ;state_variable = 4
        BRA     state_var_1_5           ;state_variable = 5
        BRA     state_var_1_6           ;state_variable = 6
        BRA     state_var_1_7           ;state_variable = 7
        BRA     state_var_1_8           ;state_variable = 8
        BRA     state_var_1_9           ;state_variable = 9
        BRA     state_var_1_10          ;state_variable = 10
        BRA     state_var_1_11          ;state_variable = 11
        BRA     state_var_1_12          ;state_variable = 12
        BRA     state_var_1_13          ;state_variable = 13
        BRA     state_var_1_14          ;state_variable = 14
        BRA     state_var_1_15          ;state_variable = 15
        BRA     state_var_1_16          ;state_variable = 16
        BRA     state_var_1_17          ;state_variable = 17
        BRA     state_var_1_18          ;state_variable = 18
        BRA     state_var_1_19          ;state_variable = 19
        BRA     state_var_1_20          ;state_variable = 20
        BRA     state_var_1_21          ;state_variable = 21
        BRA     state_var_1_22          ;state_variable = 22
        BRA     state_var_1_23          ;state_variable = 23
        BRA     state_var_1_24          ;state_variable = 24
        BRA     state_var_1_25          ;state_variable = 25
        BRA     state_var_1_26          ;state_variable = 26
        BRA     state_var_1_27          ;state_variable = 27
        BRA     state_var_1_28          ;state_variable = 28
        BRA     state_var_1_29          ;state_variable = 29
        BRA     state_var_1_30          ;state_variable = 30

BRA     state_var_1_19          ;state_variable = 31
        BRA     state_var_1_20          ;state_variable = 32
        BRA     state_var_1_21          ;state_variable = 33
        BRA     state_var_1_22          ;state_variable = 34
        BRA     state_var_1_23          ;state_variable = 35
        BRA     state_var_1_24          ;state_variable = 36

BRA     state_var_1_31          ;state_variable = 37
        BRA     state_var_1_32          ;state_variable = 38
        BRA     state_var_1_33          ;state_variable = 39
        BRA     state_var_1_34          ;state_variable = 40
```

```
        BRA     state_var_1_35      ;state_variable = 41
        BRA     state_var_1_36      ;state_variable = 42

BRA     sf_state_var_1_1    ;state_variable = 43    ;for frame 000000
        BRA     sf_state_var_1_2    ;state_variable = 44
        BRA     sf_state_var_1_3    ;state_variable = 45

BRA     sf_state_var_1_5    ;state_variable = 46    ;for frame 111111
        BRA     sf_state_var_1_6    ;state_variable = 47
        BRA     sf_state_var_1_7    ;state_variable = 48

BRA     sf_state_var_1_9    ;state_variable = 49    ;for frame 100100
        BRA     sf_state_var_1_10   ;state_variable = 50
        BRA     sf_state_var_1_11   ;state_variable = 51

BRA     sf_state_var_1_13   ;state_variable = 52    ;for frame 110110
        BRA     sf_state_var_1_14   ;state_variable = 53
        BRA     sf_state_var_1_15   ;state_variable = 54

BRA     sf_state_var_1_16   ;state_variable = 55
        BRA     sf_state_var_1_17   ;state_variable = 56
        BRA     sf_state_var_1_18   ;state_variable = 57
        BRA     sf_state_var_1_19   ;state_variable = 58

;*******************************************************
;
;The following statements are reflected to the
;state machine for ESF FRAMING and the input
;bit equals 1
;
;******************************************************* state_var_1_0:
        LDA     #02d
        BRA     store_state_var_1
state_var_1_1:
state_var_1_3:
        LDA     #04d
        BRA     store_state_var_1
state_var_1_2:
state_var_1_4:
        LDA     #06d
```

```
            BRA    store_state_var_1
state_var_1_5:
            LDA    #08d
            BRA    store_state_var_1
state_var_1_6:
            BRA    set_sf_frame_1
state_var_1_10:
state_var_1_11:
state_var_1_15:
state_var_1_19:
state_var_1_25:
state_var_1_31:
state_var_1_20:
state_var_1_26:
state_var_1_32:
state_var_1_22:
state_var_1_28:
state_var_1_34:
            BRA    store_state_var_slip_1
state_var_1_7:
            LDA    #10d                    ;2
            BRA    store_state_var_1
state_var_1_8:
            LDA    #011d
            BRA    store_state_var_1
state_var_1_9:
state_var_1_14:
            BRA    set_sf_frame_2
state_var_1_12:
state_var_1_17:
            LDA    #15d
            BRA    store_state_var_1
state_var_1_13:
state_var_1_18:
            LDA    #16d
            BRA    store_state_var_1
state_var_1_16:
            LDA    #019d
            BRA    store_state_var_1 state_var_1_21:
state_var_1_23:
state_var_1_24:
state_var_1_27:
```

```
state_var_1_29:
state_var_1_30:
state_var_1_33:
sf_state_var_1_5:
sf_state_var_1_6:
sf_state_var_1_9:
sf_state_var_1_13:
sf_state_var_1_15:
sf_state_var_1_16:
        BRA   inc_state_var_1 state_var_1_35:
        BCLR  ESF_FRAME_UP_N          ;5 turn on esf led
        good_state
        BRA   inc_state_var_1
state_var_1_36:
        LDA   #019d
        BRA   store_state_var_1 sf_state_var_1_1:
sf_state_var_1_2:
sf_state_var_1_3:
        BSET  sf_frame_3_bit          ;000000 not detected
        BRA   store_state_var_slip_1 sf_state_var_1_10:
sf_state_var_1_11:
        BSET  sf_frame_4_bit          ;100100 not detected
        BRA   store_state_var_slip_1 sf_state_var_1_14:
sf_state_var_1_17:
not_in_sf_framing:
        BSET  sf_frame_2_bit          ;not in SF framing any more
        BRA   store_state_var_slip_1 sf_state_var_1_7:
        BRSET sf_frame_2_bit,store_state_var_slip_1   ;jmp if already set
        LDX   SF_state_variable                       ;Is this a correct frame byte?
        LDA   set_sf_frame_1_table,X   ;6
        CMP   frame_seek_state
        BNE   store_state_var_slip_1                  ;if not a right frame byte,jmp
```

```
            BCLR  sf_frame_1_bit                  ;otherwise set frame bit skip_set_frame_1_bit:
            LDA   #SF_frame_1_value               ;set to next state value
            BRA   store_state_var_1 sf_state_var_1_18:
            LDA   sf_frame_variable
            BNE   not_in_sf_framing
            BCLR  SF_FRAME_UP_N                   ;
            CLR   state_variable                  ;initial state for sf mode
            BRA   inc_state_var_1 sf_state_var_1_19:
            LDA   #SF_frame_2_value               ;set to next state value
            BRA   store_state_var_1 store_state_var_1:
            LDX   frame_seek_state
            STA   state_variable,X
            RTS set_sf_frame_1:
            BRSET sf_frame_2_bit,store_state_var_slip_1
            LDA   #SF_frame_1_value               ;set to next state value
            BRA   store_state_var_1
    set_sf_frame_2:
            LDA   #SF_frame_2_value               ;set to next state value
            BRA   store_state_var_1 store_state_var_slip_1:
    ;*      LDA   #invalid_state_value
            slip_bit
            RTS inc_state_var_1:
            LDX   frame_seek_state
            INC   state_variable,X
    state_machine_sub_EXIT:
            RTS
```

```
;****************************************************************
;****************************************************************
;****************************************************************

;*******************************************
;ESF ARMING or LOOPDOWN CODE DETECT
;******************************************* import  lpup_value,lpdn_value
        import  DL_BYTE_COUNT
        import0 DL_BIT_COUNTER
        import0 esf_debounce_count,ESF_CURRENT_CODE,DL_BYTE_COUNTER
        import  ESF_LOOP_TABLE
        import0 ESF_CURRENT_STATE,ESF_IGNORE_STATE ESF_LOOP_DETECT:
        CLC                     ;1st chk what dl bit ='s clear carry bit
        BRCLR   bit_193,DL_00   ;chk level at 0,cport see if =1 or =0
        SEC
DL_00:
        ROR     DL_DATA_L
        ROR     DL_DATA_U
        BRSET   HARD_LOOP,EXIT_ESF_LOOP_DET         ;if in manual lpbk,exit
        BRSET   get_esf_lpbk,EXIT_ESF_LOOP_DET      ;if in manual lpbk,exit
        BRCLR   DL_16BITS_FLAG,chk_high_byte        ;JUMP IF BIT COUNTER NOT RUNNING
        DEC     DL_BIT_COUNTER                      ;COUNT 16 BIT DL CHUNKS
        TST     DL_BIT_COUNTER
        BNE     EXIT_ESF_LOOP_DET
chk_high_byte:
        LDA     DL_DATA_U
        CMP     #ESF_HEADER     ; Start of message (probably 0FFH)
        BEQ     CHK_LOOP_CODE
        BRA     ESF_CODE_STATE_UNKNOWN

EXIT_ESF_LOOP_DET:
        RTS

;       BRA     EXIT_ESF_LOOP_DET

CHK_LOOP_CODE:
```

```
            LDX     DL_DATA_L           ;check esf arming code
            LDX     ESF_LOOP_TABLE,X
            JMP     esf_jmp_table,X     ;

esf_jmp_table:
            BRA     ESF_CODE_STATE_UNKNOWN      ;ADDR 0
            BRA     ESF_CODE_STATE_UP           ;ADDR 2
            BRA     ESF_CODE_STATE_DN           ;ADDR 4

ESF_CODE_STATE_UNKNOWN:                         ;unknown code
            BCLR    DL_16BITS_FLAG
            STX     ESF_CURRENT_CODE
            LDA     #DL_BYTE_COUNT
            STA     DL_BYTE_COUNTER             ;RELOAD DL BYTE COUNTER
            BRCLR   ignore_esf_code,current_state_unknown
        ;   LDA     #010H
        ;   STA     DL_BIT_COUNTER
            DEC     esf_debounce_count
            TST     esf_debounce_count
            BNE         ESF_CODE_STATE_UNKNOWN_EXIT
            BCLR    ignore_esf_code
            RTS
        current_state_unknown:
            CLR     ESF_IGNORE_STATE
        ESF_CODE_STATE_UNKNOWN_EXIT:
            RTS ESF_CODE_STATE_UP:
            LDA     #010H
            STA     DL_BIT_COUNTER
            BRCLR   ignore_esf_code,esf_dec_up_counter
            BRSET   ignore_esf_lpup,esf_load_debounce_up    ;jmp if ignore lpup code required
            DEC     esf_debounce_count
            TST     esf_debounce_count
            BNE     esf_dec_up_counter
            BCLR    ignore_esf_code
            RTS
        esf_load_debounce_up:
            LDA #0FFH
            STA esf_debounce_count
            BRA ESF_CODE_STATE_UP_EXIT esf_dec_up_counter:
            BRCLR   DL_16BITS_FLAG,first_time_valid_code
```

```
          CPX     ESF_CURRENT_CODE        ;has to see 5 consecutive codes
          BNE     first_time_valid_code   ;has to see 5 consecutive codes
          DEC     DL_BYTE_COUNTER         ;COUNT 10 LOOP CODE BYTE
          TST     DL_BYTE_COUNTER         ;COUNT 10 LOOP CODE BYTE
5         BNE     ESF_CODE_STATE_UP_EXIT  ;COUNT 10 LOOP CODE BYTE
          LDA     #lpup_value             ;rcv esf lpup codes
          STA     ESF_CURRENT_STATE       ;rcv lpup codes
     ;    LDA     #ignore_lpup_value      ;ignore esf lpup codes
          STA     ESF_IGNORE_STATE        ;ignore esf lpup codes
10    ESF_CODE_STATE_UP_EXIT:
          RTS ESF_CODE_STATE_DN:
          LDA     #010H
          STA     DL_BIT_COUNTER
15        BRCLR   ignore_esf_code,esf_dec_dn_counter
          BRSET   ignore_esf_lpdn,esf_load_debounce_dn    ;jmp if ignore lpdn code required
          DEC     esf_debounce_count
          TST     esf_debounce_count
          BNE     esf_dec_dn_counter
20        BCLR    ignore_esf_code
          RTS
      esf_load_debounce_dn:
          LDA #0FFH
          STA esf_debounce_count
25        BRA ESF_CODE_STATE_DN_EXIT esf_dec_dn_counter:
          BRCLR   DL_16BITS_FLAG,first_time_valid_code
          CPX     ESF_CURRENT_CODE        ;has to see 5 consecutive codes
          BNE     first_time_valid_code   ;has to see 5 consecutive codes
30        DEC     DL_BYTE_COUNTER         ;COUNT 10 LOOP CODE BYTE
          TST     DL_BYTE_COUNTER         ;COUNT 10 LOOP CODE BYTE
          BNE     ESF_CODE_STATE_DN_EXIT  ;COUNT 10 LOOP CODE BYTE
          LDA     #lpdn_value             ;rcv esf lpdn codes
          STA     ESF_CURRENT_STATE       ;rcv lpdn codes
35    ;   LDA     #ignore_lpdn_value      ;ignore esf lpdn codes
          STA     ESF_IGNORE_STATE        ;ignore esf lpdn codes
      ESF_CODE_STATE_DN_EXIT:
          RTS first_time_valid_code:
40        BSET DL_16BITS_FLAG             ;wait until the next 2 bytes are ready
          LDA  #DL_BYTE_COUNT             ;RELOAD DL BYTE COUNTER
```

```
            STA     DL_BYTE_COUNTER         ;RELOAD DL BYTE COUNTER
            STX     ESF_CURRENT_CODE        ;get original code
            RTS ;***********************************
        ;
        ;
        ;Table is used to clear the slip bit
        ;for the current state
        ;
        ;*********************************** clear_slip_bit_table:
                DB 0FFh,0FDh,0FBh,0F7h,0EFh     ;4=1110 1111, 1=1111 1101
                                                ;2=1111 1011, 3=1111 0111

;***********************************
        ;
        ;Table is used to set the slip bit
        ;for the current state
        ;
        ;*********************************** set_slip_bit_table:
                DB 000h,002h,004h,008h,010h     ;4=0001 0000, 1=0000 0010
                                                ;2=0000 0100, 3=0000 1000 set_sf_frame_1_table:
                DB 00h,04h,01h,02h,03h;
        set_sf_frame_3_table:
                DB 00h,02h,03h,04h,01h     ;
        set_sf_frame_4_table:
                DB 00h,03h,04h,01h,02h     ;

END list"off"
        #include         define.s
                list"on"
        ;
        ;****************************************************************
        ;       INTERNAL REAL TIME INTERRUPT
        ;****************************************************************
        ;
```

```
         import0  INT_CNT,ERROR_CNT,UTMR
         import0  TMR1,TMR2,TMR3,TMR4,SCAN_TMR,MS_COUNTER
         import0  OCRTEMPLO,ICLR,TSR,FLAG3,FLAG4,FLAG1
         import0  OCHR,OCLR,COPRR,BPORT,APORT 5        import   LOWTIMERVAL,HIGHTIMERVAL
         import   TIMEOUT_H,TIMEOUT_L
         import   TMR1_value,TMR2_value,TMR3_value,TMR4_value region "MAIN"

export INT_TMR
10   INT_TMR:                    ;100 uS interrupt
         LDA   OCLR               ;LOW BYTE OUTPUT COMPARE REG.
         ADD   #LOWTIMERVAL       ;ADD NEXT TIME TO INTERRUPT
         STA   OCRTEMPLO          ;STORE LOW VAL TEMP. TILL UPPER CALC.
         LDA   OCHR               ;HIGH BYTE
15       ADC   #HIGHTIMERVAL      ;TIMER COEFF. HIGH BYTE
         STA   OCHR
         LDA   TSR                ;ACCESS TIMER STATUS REG. CLEARS IT
         LDA   OCRTEMPLO
         STA   OCLR
20       LDA   #55H               ;VALUE FOR WATCHDOG RESET
         STA   COPRR              ;STORE IN COP RESET REGISTER
         LDA   #0AAH              ;VALUE FOR WATCHDOG RESET
         STA   COPRR              ;STORE IN COP RESET REGISTER
     ;-------------------------------------------------------------------
25   ;THIS SECTION FOR ERROR THRESHOLD USES INPUT CAPTURE ON PIN 41
     ;LABELED AS TCAP
     ;   THIS PORTION COMPARES AMOUNT OF TIME BETWEEN ERROR (INTERRUPTS)
     ; TO DECIDE IF A PATTERN MATCH HAS BEEN MADE OR IF TO MANY ERRORS
     ARE
30   ; OCCURRING
     ; THEORY HERE IS THAT THE INTERRUPT MUST SEE AT LEAST 4 CLEAN
     INTERRUPTS
     ; BEFORE ERROR_CNT HAS INCREMENTED TO 32. THIS WORKS OUT TO APPROX.
     ; 100 BITS IN 1000 BITS or maybe not?
35   ;-------------------------------------------------------------------
         export IC_INT              ;1st chk if a pos. edge has been detected in the
     ;-------------------------------------------------------------------
     ;         error chk routine   for tcap input
     ;-------------------------------------------------------------------
40   IC_INT:
         TST   INT_CNT            ;CHK IF CNT=0 DON'T CHK FOR ERR'S
```

```
                BEQ     IC_S00          ;
                BRCLR   7,TSR,NO_ERROR  ;IF CLR <NO ERRORS> DON'T INCREAMENT
        ERROR_CNT
                LDA     ICLR            ;A READ OF THIS REG CLR'S FLAG (INPUT CAPTURE)
                INC     ERROR_CNT       ;UPDATE ERROR_CNT INDICATES ERROR HIT
        NO_ERROR:                       ;
                DEC     INT_CNT         ;INDICATE NUMBER OF REAL TIME INTERRUPTS
        IC_S00:
        ;----------------------------------------------------------------
        ;       chk if armming flag is still set if not turn led off
        ;----------------------------------------------------------------
        TSTTMR1:
                TST     TMR1            ;<------------ this counter reset to 5
                BEQ     reload_tmr1     ;
                DEC     TMR1            ;
                JMP     INTEND          ;if 5 interrupts have'nt passed then exit interrupt ;****************************************************
        ;The following codes are executed every 1 ms
        ;****************************************************
        reload_tmr1:
                LDA     #TMR1_value     ;reset 1 mS counter
                STA     TMR1            ;

TST     MS_COUNTER
                BEQ     test_tmr2
                DEC     MS_COUNTER test_tmr2:
                TST     TMR2            ;test 200ms timer
                BEQ     reload_tmr2     ;
                DEC     TMR2            ;
                JMP     INTEND
        ;****************************************************
        ;The following codes are executed every 200 ms
        ;****************************************************
        reload_tmr2
                LDA     #TMR2_value     ;reset 200 mS counter
                STA     TMR2            ;

TST     SCAN_TMR        ;'SCAN_TMR' used in file 'SUB.S' for controlling
                BEQ     CHK_UTMR        ; amount of time data direction A or B is looked
                DEC     SCAN_TMR        ; at A/B direction controlled by one port line
```

```
        CHK_UTMR:
            TST    UTMR           ;'UTMR' is a user timer which can be used
            BEQ    CHK_MAINT      ; during times when 'SCAN_TMR' is going to
            DEC    UTMR           ; be used 5      CHK_MAINT:
            BRCLR  $MAINT_FLASH,TSTTMR3
            LDA    APORT
            EOR    #00000010B     ;TOGGLE MAINT LED
            STA    APORT
10
        TSTTMR3:
            TST    TMR3           ;test .4 second timer
            BEQ    BLINK_LED      ;
            DEC    TMR3           ;
15          BRA    TSTTMR4        ;
        BLINK_LED:
            LDA    #TMR3_value    ;reset .4S counter
            STA    TMR3           ;

BRCLR  LOOP_FLAG_O,TSTTMR4
20          BRSET  LPBK_TO_DISABLE,TSTTMR4
            LDA    BPORT
            EOR    #00000100B     ;TOGGLE LPBK LED
            STA    BPORT

TSTTMR4:
25          TST    TMR4           ;test 10 second timer
            BEQ    reload_tmr4    ;
            DEC    TMR4           ;
            JMP    INTEND ;****************************************************
30      ;The following codes are executed every 30 seconds
        ;****************************************************
        reload_tmr4:
            LDA    #TMR4_value    ;reset 10S counter
            STA    TMR4           ;

35          BRSET  LPBK_TO_DISABLE,INTEND
            BRSET  timeout_flag,INTEND
            TST    TIMEOUT_L      ;See if this counter is zero
            BNE    dec_timeout_l  ;It is, so don't decrement it
            TST    TIMEOUT_H
```

```
            BEQ   set_timeout_flag      ;timeout
            DEC   TIMEOUT_H
dec_timeout_l:
            DEC   TIMEOUT_L
            JMP   INTEND
set_timeout_flag:
            BSET  timeout_flag

INTEND:
            RTI   ;<------ EXIT TIMER INTERRUPT

;***********************************************************************
;***********************************************************************
;***********************************************************************
;       EXTERNAL INTERRUPT   250 interrupt from g.a. occurs
;                       when ESF framing is present on
;                       the office side.
;                       PIN SET UP FOR FALLING EDGE DETECT
;***********************************************************************
;       export IRQ
;***********************************************************************
;***********************************************************************
;***********************************************************************
;   PURPOSE HERE IS TO LOOK FOR LOOPBACK CODES IN DL BITS  (BFD)
;   interrupt is sent to processor on pin 2 (IRQ)
;   Routine formerly labeled DL_BIT_DECODER.
;***********************************************************************
;***********************************************************************
;***********************************************************************

;***********************************************************************
;***********************************************************************
;       SERIAL COMM. INTERRUPT
;***********************************************************************
;***********************************************************************
;*********************************************************************** export READ1

READ1:
;           LDA   SCSR
```

```
;       AND    #020H
;       BEQ    READ_END
;       LDA    SCDR
;       STA    RD_TMP
;       INC    BUFF_PTR
;       LDX    BUFF_PTR
;       STA    READ_BUFF,X

;       LDA    BUFF_PTR
;       CMP    #002D              ;CHK FOR TYPE OF COMMAND
;       BNE    CHK_3CNT
;       LDA    RD_TMP
;       CMP    #080H
;       BEQ    SEND_DATA
;WRITE_DATA:
;       LDA    BUFF_PTR
;CHK_3CNT:
;       CMP    #003D
;       BEQ    STORE_DATA
;       BRA    GET_DATA_END
;       export STORE_DATA,READ_END,CHK_3CNT
;STORE_DATA:
;       BSET   $SCI_FLAG
;       LDX    #001D
;       LDA    READ_BUFF,X ;GET ADDR OFFSET
;       STA    CMD_ADDR
;       LDX    #003D
;       LDA    READ_BUFF,X
;       LDX    CMD_ADDR
;       STA    STAT_TBL,X
;       CLR    BUFF_PTR
;READ_END:
;       BRA    GET_DATA_END
;       export SEND_DATA
;SEND_DATA:
;       LDX    #001D              ;GET ADDRESS TO READ DATA
;       LDA    READ_BUFF,X        ;READ DATA FROM STATUS TABLE
;       TAX
;       LDA    STAT_TBL,X
;       STA    STR1
;       JSR    WRITE1             ;SEND DATA OUT SCI PORT
;       CLR    BUFF_PTR
;GET_DATA_END:
```

```
            RTI    ;<--- EXIT SCI INTERRUPT

;***************************************************************

;       export WRITE1

;WRITE1:
    ;       LDA   SCSR
    ;       AND   #080H
    ;       BEQ   WRITE1
    ;       LDA   STR1
    ;       STA   SCDR
    ;       RTS list"off"
    #include        define.s
    #include        debounce.s
            list"on"

import0  BPORT,FLAG1,FLAG5
            import0  APORT,FLAG3,FLAG4
            import0  GATE_ARRAY_REG2,qualify_time
            import0  DEBOUNCE_CNT import AIS_to_dsx_value
            import TIME_0SEC,TIME_150MS
            import normal_control_value,DET_LOS_CODE
            import SCAN_QUALIFY,SCAN_LOSS region "MAIN"
    ;---------------------------------------------------------------
    ; loss of signal and AIS enable/disable checking
    ;---------------------------------------------------------------
    chk_nonmon_debounce:       #macro
        BRSET  $1,$2,chk_SW_LOW$$        ;jmp if SW is disable(active low)
        BRSET  $3,$4,chk_nonmon_debounce_EXIT$$   ;jmp with no change in SW and it is enable
        BRA    chk_SW_debounce$$
    chk_SW_LOW$$:                        ;SW is deactive
        BRCLR  $3,$4,chk_nonmon_debounce_EXIT$$ ;jmp with no change in SW and it is disable
    chk_SW_debounce$$:
        chk_debounce    $5,$1,$2 ;switch changed,50 ms debounce checking
```

```
            BSET    $3,$4           ;switch is qualified to be active
            BRA     chk_nonmon_debounce_EXIT$$
    $5:                             ;SW is disable      after checking
            BCLR    $3,$4           ;switch is qualified to be deactive
    chk_nonmon_debounce_EXIT$$:
            #endm chk_loss_debounce_xilinx:
    reload_los_debounce:
            LDX     TIME_150MS
            STX     DEBOUNCE_CNT
    scan_los_again:
            ;JSR    SCAN_QUALIFY    ;CHK IF PATTERN IS BEING RECEIVED for 1 second
            JSR     SCAN_LOSS
            BRSET   HARD_LOOP,chk_loss_debounce_xilinx_exit
            BRCLR   $COMP_FLAG,reload_nolos_debounce  ;IF 1ST COMP LINE IS HIGH THEN
    PATT. DETECTED
            DEC     DEBOUNCE_CNT
            BNE     scan_los_again
            BRA     chk_loss_debounce_xilinx_exit
    reload_nolos_debounce:
            LDX     TIME_150MS
            STX     DEBOUNCE_CNT
    scan_nolos_again:
            ;JSR    SCAN_QUALIFY    ;CHK IF PATTERN IS BEING RECEIVED for 1 second
            JSR     SCAN_LOSS
            BRSET   HARD_LOOP,chk_loss_debounce_xilinx_exit
            BRSET   $COMP_FLAG,reload_los_debounce    ;IF 1ST COMP LINE IS HIGH THEN
    PATT. DETECTED
            DEC     DEBOUNCE_CNT
            BNE     scan_nolos_again
    chk_loss_debounce_xilinx_exit:
            RTS export chk_los_AIS chk_los_AIS:
            BCLR    COMP_FLAG
            BCLR    LP_2SEC_DET     ;This gets set when we're looking for an address
            LDA     #TIME_0SEC      ;set scan time to 1 second
            STA     qualify_time
            BCLR    DATA_SEL        ;set to office side
            JSR     DET_LOS_CODE    ;GO SET UP GATE ARRAY
```

```
        JSR   SCAN_QUALIFY   ;CHK IF PATTERN IS BEING RECEIVED for 1 second
        BRSET HARD_LOOP,chk_los_AIS_EXIT
        BRCLR $COMP_FLAG,chk_prev_nolos_dsx   ;IF 1ST COMP LINE IS HIGH THEN
PATT. DETECTED
        BRSET LOS_SPARE_FLAG,dsx_led_los
        JSR   chk_loss_debounce_xilinx
        BRCLR $COMP_FLAG,dsx_led_nolos   ;IF 1ST COMP LINE IS HIGH THEN PATT.
DETECTED
        BSET  LOS_SPARE_FLAG
dsx_led_los:
        BCLR  SPARE_LOS_LED              ;turn on loss of signal led for spare line
        BRA   chk_span_regen
chk_prev_nolos_dsx:
        BRCLR LOS_SPARE_FLAG,dsx_led_nolos
        JSR   chk_loss_debounce_xilinx
        BRSET $COMP_FLAG,dsx_led_los    ;IF 1ST COMP LINE IS HIGH THEN PATT.
DETECTED
        BCLR  LOS_SPARE_FLAG
dsx_led_nolos:
        BSET  SPARE_LOS_LED              ;turn off loss of signal led for spare line chk_span_regen:
        ; c h k _ n o n m o n _ d e b o u n c e
DSX_REGEN_SW_N,DSX_REGEN_FLAG,NO_DSX_REGEN_SW
        JSR   XMT_AIS_xilinx
chk_los_AIS_EXIT:
        RTS ;----------------------------------------------------------
; SET CONTROL BYTE to XILINX to XMT AIS to both sides
;----------------------------------------------------------
        export XMT_AIS_xilinx XMT_AIS_xilinx:
        BRSET LOOP_FLAG_0,get_out        ;if in lpbk, jmp
        BRCLR SPAN_AIS,set_normal
        LDA   #AIS_to_dsx_value          ;send AIS to dsx
        STA   GATE_ARRAY_REG2            ;MODIFY HEADER BYTE
        RTS set_normal:
        LDA   #normal_control_value
        STA   GATE_ARRAY_REG2            ;MODIFY HEADER BYTE
get_out:
```

RTS

|  |  |  |  |
|---|---|---|---|
| UP_0 | EQU | 02h | ;loop up code converted index value |
| DN_0 | EQU | 04h | ;loop dn code converted index value | export   ESF_LOOP_TABLE region "MAIN"

ESF_LOOP_TABLE:

```
        DB 000H,000H,000H,000H,000H,000H,000H,000H ;00-07
        DB 000H,000H,000H,000H,000H,000H,000H,000H ;08-0F
        DB 000H,000H,UP_0,000H,000H,000H,000H,000H ;10-17  12H
        DB 000H,000H,000H,000H,000H,000H,000H,000H ;18-1F
        DB 000H,000H,000H,000H,DN_0,000H,000H,000H ;20-27  24H
        DB 000H,000H,000H,000H,000H,000H,000H,000H ;28-2F
        DB 000H,000H,000H,000H,000H,000H,000H,000H ;30-37
        DB 000H,000H,000H,000H,000H,000H,000H,000H ;38-3F
        DB 000H,000H,000H,000H,000H,000H,000H,000H ;40-47
        DB 000H,000H,000H,000H,000H,000H,000H,000H ;48-4F
        DB 000H,000H,000H,000H,000H,000H,000H,000H ;50-57
        DB 000H,000H,000H,000H,000H,000H,000H,000H ;58-5F
        DB 000H,000H,000H,000H,000H,000H,000H,000H ;60-67
        DB 000H,000H,000H,000H,000H,000H,000H,000H ;68-6F
        DB 000H,000H,000H,000H,000H,000H,000H,000H ;70-77
        DB 000H,000H,000H,000H,000H,000H,000H,000H ;78-7F
        DB 000H,000H,000H,000H,000H,000H,000H,000H ;80-87
        DB 000H,000H,000H,000H,000H,000H,000H,000H ;88-8F
        DB 000H,000H,000H,000H,000H,000H,000H,000H ;90-97
        DB 000H,000H,000H,000H,000H,000H,000H,000H ;98-9F
        DB 000H,000H,000H,000H,000H,000H,000H,000H ;A0-A7
        DB 000H,000H,000H,000H,000H,000H,000H,000H ;A8-AF
        DB 000H,000H,000H,000H,000H,000H,000H,000H ;B0-B7
        DB 000H,000H,000H,000H,000H,000H,000H,000H ;B8-BF
        DB 000H,000H,000H,000H,000H,000H,000H,000H ;C0-C7
        DB 000H,000H,000H,000H,000H,000H,000H,000H ;C8-CF
        DB 000H,000H,000H,000H,000H,000H,000H,000H ;D0-D7
        DB 000H,000H,000H,000H,000H,000H,000H,000H ;D8-DF
        DB 000H,000H,000H,000H,000H,000H,000H,000H ;E0-E7
        DB 000H,000H,000H,000H,000H,000H,000H,000H ;E8-EF
        DB 000H,000H,000H,000H,000H,000H,000H,000H ;F0-F7
```

```
              DB  000H,000H,000H,000H,000H,000H,000H,000H  ;F8-FF list"off"
include      ..\lib\define.s
          list"on"

5         import0  FLAG1,FLAG3,FLAG4,FLAG5,BPORT
          import0  main_current_state,CCU_RESPONSE,power_byte import main_normal_state_value
          import main_in_lpbk_value
          import main_in_maint_value 10        import check_loopdown_code,CHK_QUERY_CODE
          import LOAD_GATE_ARRAY,DET_LPUP_CODE
          import OFFICE_ON,SET_LOOP_TIMEOUT
          import chk_lpup,CHK_MAN_RESTORE,SCAN
          import chk_manual_lpbk,DO_MAN_LPBK,LOOP_DWN
15        import chk_los_AIS,CHK_RESTORE_CODE
          import CHK_FOR_XFER,SEND_ADDRESS,SCAN_RPT
          import CHK_TIMEOUT_CODE,DELAY_WAIT
          import chk_oos_lpup,chk_oos_lpdn,chk_card_loss region "MAIN"

20    ;----------------------------------------------------------------
      ;---------------------------------------------------------------- export MAIN
      ;   export MAIN,ARM_LOOP,ARM_CODE_DET,LP_DET
      ;   export P_R 25    ;----------------------------------------------------------------
MAIN:
      ;   JSR   NORM_OUTPUT  ;JUST PASS DATA THRU GATE TURN OFF
                             ;GENERATOR MUX
          JSR   LOAD_GATE_ARRAY 30        BSET  LPBK_LED
          BRA   start_chk_main
in_main:
      ;   BRCLR HARD_LOOP,chk_hard_loop
          JSR   DO_MAN_LPBK           ;perform manual lpbk
```

```
                BCLR    HARD_LOOP               ;done checking
        ;       BRCLR HARD_LOOP_0,start_chk_main    ;if in lpbk,ignore lpbk code
        ;chk_hard_loop:
        ;       JSR    chk_los_AIS   ;check loss of signal and AIS enable/disable SWs
5       ;       JSR    check_loopdown_code
        ;       BRCLR  $COMP_FLAG,in_main      ;SCAN FOR PATTERN IN ONE DIRECTION
        ;main_man_lpdn:
        ;       JSR    LOOP_DWN start_chk_main:
10              LDA    #main_in_maint_value
                CMP    main_current_state
                BEQ    no_manual_lpbk
                JSR    chk_manual_lpbk
                BRSET  HARD_LOOP,in_main
15      no_manual_lpbk:
                JSR    chk_los_AIS         ;check loss of signal and AIS enable/disable SWs
                LDX    main_current_state
                LSLX                       ;multiply reg X by 2
                JMP    main_state_table,X    ;

20      main_state_table:
                BRA    NORMAL_STATE        ;0 ,normal state
                BRA    IN_LPBK_STATE       ;2 ,lpbk state
                BRA    IN_MAINT_STATE      ;4 ,armed state NORMAL_STATE:
25              BSET   SPAN_AIS
                BCLR   SENDING_ONES   ;This flag indicates in the process
                                      ;of qualifying loopup code
                JSR    check_loopdown_code      ;check loopdown code including esf lpdwn for both
        side
30      ARM_LOOP:
                JSR    chk_los_AIS   ;check loss of signal and AIS enable/disable SWs
                JSR    chk_lpup
                BRSET  $COMP_FLAG,ARM_CODE_DET    ;jmp if arming went away
                BRA    NORMAL_STATE_EXIT
35      ARM_CODE_DET:

;********************
        ; loop up the unit now
        ;********************

DO_OFFICE_LPBK:
```

```
              BCLR   SPAN_AIS
              JSR    OFFICE_ON      ;
              JSR    SET_LOOP_TIMEOUT
              LDA    #main_in_lpbk_value
  5           STA    main_current_state     ;go to LPBK state
              BCLR   $LP_2SEC_DET
              BCLR   $COMP_FLAG
              BCLR   $DATA_SEL
              JSR    DET_LPUP_CODE
 10           JSR    SCAN
              BRCLR  $COMP_FLAG,NORMAL_STATE_EXIT
              LDA    #35
              STA    CCU_RESPONSE
              JSR    SEND_ADDRESS
 15           JSR    SCAN_RPT

NORMAL_STATE_EXIT:
              JMP    MAIN_EXIT

IN_LPBK_STATE:

;*******************************************
 20   ;
      ; The unit is in loopback now and looking for
      ;  univ. loopdown codes
      ;
      ;*******************************************

25   DWN_CONT1:
              BCLR   $DATA_SEL
              JSR    CHK_QUERY_CODE
              JSR    CHK_TIMEOUT_CODE
              JSR    chk_lpup
 30           JSR    check_loopdown_code    ;check loopdown code including esf lpdwn for both
              side
              BRSET  $COMP_FLAG,DWN_CODE_DET    ;CHECK IF 1ST COMP IS MADE
              BRSET  timeout_flag,DWN_CODE_DET
              JSR    CHK_FOR_XFER
 35           CMP    #55H
              BEQ    DWN_CODE_DET
              BRCLR  $COMP_FLAG,MAIN_EXIT
              JSR    LOOP_DWN
              LDA    #main_in_maint_value
 40           STA    main_current_state     ;go to MAINTENANCE state
```

```
                BRA   MAIN_EXIT

DWN_CODE_DET:
                JSR   LOOP_DWN
                LDA   #main_normal_state_value    ;go to normal sta
  5             STA   main_current_state          ;go to normal state

BRA   MAIN_EXIT

IN_MAINT_STATE:
                BSET  $DATA_SEL
                JSR   CHK_QUERY_CODE

10             JSR   chk_card_loss
                BRSET $COMP_FLAG,EXIT_MAINT

JSR   CHK_MAN_RESTORE
                BRSET $COMP_FLAG,EXIT_MAINT

JSR   CHK_RESTORE_CODE
 15             BRSET $COMP_FLAG,EXIT_MAINT

BRCLR $OOS_LPBK,CHECK_OOS_LPUP
                JSR   chk_oos_lpdn
                BRCLR $COMP_FLAG,MAIN_EXIT
                BCLR  $OOS_LPBK
 20             BCLR  $oos_cutoff
                JSR   LOAD_GATE_ARRAY ;
                LDA   #02D
                JSR   DELAY_WAIT
                BRA   MAIN_EXIT
 25     CHECK_OOS_LPUP:
                JSR   chk_oos_lpup
                BRCLR $COMP_FLAG,MAIN_EXIT
                BSET  $oos_cutoff
                JSR   LOAD_GATE_ARRAY ;
 30             LDA   #02D
                JSR   DELAY_WAIT
                BSET  $OOS_LPBK
                BSET  $DATA_SEL
                JSR   DET_LPUP_CODE
 35             JSR   SCAN
                BRCLR $COMP_FLAG,MAIN_EXIT
                LDA   #35
```

```
              STA   CCU_RESPONSE
              JSR   SEND_ADDRESS
              JSR   SCAN_RPT
              BRA   MAIN_EXIT

5      EXIT_MAINT:
              JSR   LOOP_DWN
              BCLR  $OOS_LPBK
              BCLR  $oos_cutoff
              JSR   LOAD_GATE_ARRAY ;
10            LDA   #02D
              JSR   DELAY_WAIT
              LDA   #main_normal_state_value    ;go to normal state
              STA   main_current_state          ;go to normal state
              BCLR  $HARD_LOOP 15     MAIN_EXIT:
              JMP   start_chk_main list"off"
       #include    define.s
              list"on"

20            import0  qualify_time,INT_CNT,SHFT_CNT
              import0  DET_PATTERN,DET_PATTERN_2
              import0  SCAN_TMR,MS_COUNTER,GATE_ARRAY_REG2
              import0  ERROR_CNT,power_byte
              import0  APORT,CPORT,BPORT
25            import0  FLAG1,FLAG3,FLAG4
              import0  main_current_state
              import0  CCU_RESPONSE,CCU_ERR_CNT import   main_normal_state_value,REPEAT_ADDRESS
              import   INT_CNT_value_2,ERROR_CNT_value_2
30            import   INT_CNT_value,ERROR_CNT_value
              import   lpbk_no_LIS_value
              import   xmt_xilinx_buffer,TIME_1SEC,TIME_20SEC
              import   LP_UP_CODE_2,LP_DWN_CODE_2,LP_UP_CODE
              import   LP_DWN_CODE,CNT_DWN_2SEC,TIMEOUT_CODE
35            import   chk_manual_lpbk,chk_los_AIS,TIMEOUT_CODE_2
              import   LOS_CODE,LOS_CODE_2,QUERY_CODE
              import   RESTORE_CODE,RESTORE_CODE_2
              import   TIMEOUT_H,TIMEOUT_L,LOOP_TO_TIME_H,LOOP_TO_TIME_L
```

```
            region "MAIN"

export OFFICE_OFF,OFFICE_ON
            export SCAN
     SCAN:

5           BCLR  $COMP_FLAG    ;INDICATE BAD COMPARE
            BRSET HARD_LOOP,SCAN_END      ;if in manual lpbk,do not scan data
            LDA   #INT_CNT_value    ;2 ms delay
            JSR   DELAY_US_WAIT CLR   ERROR_CNT
10          LDA   #INT_CNT_value    ;CHK FOR 10 CLEAN INTERRUPTS IN A ROW.
            JSR   DELAY_US_WAIT
            LDA   ERROR_CNT         ;
            CMP   #ERROR_CNT_value        ;
            BHI   S2_02       ;
15          BRA   ERR_THRES2   ;SINCE PATTERN HAS BEEN DETECTED GO
                               ;TO 5 SEC CHK
     S2_02:
            BCLR  $COMP_FLAG    ;INDICATES PATTERN DET. BAD <NO COMPARE>
            JSR   chk_manual_lpbk
20   SCAN_END:
            RTS

;_____

EXPORT SCAN_QUALIFY
     SCAN_QUALIFY:

25          BCLR  $COMP_FLAG    ;INDICATE BAD COMPARE
            BRSET HARD_LOOP,SCAN_END      ;if in manual lpbk,do not scan data
            LDA   #INT_CNT_value    ;2 ms delay
            JSR   DELAY_US_WAIT CLR   ERROR_CNT     ;incremented in interrupt every time
30                              ;error occurs
            LDA   #INT_CNT_value    ;CHK FOR 10 CLEAN INTERRUPTS IN A ROW.
            JSR   DELAY_US_WAIT
            LDA   ERROR_CNT         ;
            CMP   #ERROR_CNT_value        ;
35          BHI   S3_02       ;if number of errors detected exceeds 4
                              ;then no good
            LDA   qualify_time ;load time for qualify from buffer
```

```
            BNE    store_scan_time
            BSET   $COMP_FLAG    ;INDICATES PATTERN DET. BAD <NO COMPARE>
            RTS store_scan_time:
            STA    SCAN_TMR
            BRA    ERR_CONT1     ;go to check for qualify
        S3_02:
            BCLR   $COMP_FLAG    ;INDICATES PATTERN DET. BAD <NO COMPARE>
            JSR    chk_manual_lpbk
            RTS
        ;----------------------------------------------------------------
        ; MUST MEET ERROR THRESHOLD AND 5 SEC TIME BEFORE ACCEPTING AS CODE
        ;----------------------------------------------------------------
        ERR_THRES2:
            JSR    SET_TIME_OUT  ;WAIT 5 SEC FOR PATTERN DETECTION TIME
            BRCLR  SENDING_ONES,ERR_CONT1   ;If sendig all 1s, change
                                            ;detect time to 3 seconds
            JSR    SET_TIME_OUT2
        ERR_CONT1:
            LDA    #INT_CNT_value_2    ;CHK FOR 10 CLEAN INTERRUPTS IN A ROW.
            STA    INT_CNT
            CLR    ERROR_CNT           ;RESET ERROR COUNTER
        DET_WT3:            ;
            BRSET  HARD_LOOP,SCAN_RET
            ;BRCLR ESF_LED,SCAN_RET     ;if in esf mode,jmp
            BRCLR  LP_2SEC_DET,CHECK_5  ;See if we're looking for a
                                        ;loopup address
                                        ;We are, so
            LDA    SCAN_TMR      ;see if address is qualified for 2 seconds
            CMP    #CNT_DWN_2SEC
            BHI    CHECK_5
        ;   JSR    XMT_AIS_2sec  ;Yes
            BCLR   LP_2SEC_DET   ;Reset the flag, so you don't keep writing
                                 ;to the gate array
            BSET   SENDING_ONES  ;Indicate to scan timer we've already qual-
                                 ;ified for 2 seconds.
            CLR    ERROR_CNT     ;prevent errors for turning on relay
        CHECK_5:
            TST    SCAN_TMR     ;
            BEQ    DET_EXIT3     ;IF SCAN_TMR TIMES OUT: INDICATES
                                 ;PATTERN GOOG FOR 5 SEC'S
            TST    INT_CNT       ;IF NOT TIMED OUT CHK IF 8 INTERRUPTS
                                 ;HAVE PASSED
```

```
            BNE    DET_WT3    ;
            LDA    ERROR_CNT  ;IF 8 INTERRUPTS HAVE PASSED CHK HOW
                              ;MANY ERRS OCCURED
            CMP    #ERROR_CNT_value_2  ;
  5         BHI    SCAN_EXIT  ;IF MORE THEN 2 THEN BAD NOT GOOD EXIT
            LDA    #INT_CNT_value_2    ;CHK FOR 10 CLEAN INTERRUPTS IN A ROW.
            STA    INT_CNT
            CLR    ERROR_CNT           ;RESET ERROR COUNTER
            JSR    chk_manual_lpbk
 10         BRA    DET_WT3    ;
      DET_EXIT3:               ;
            BSET   $COMP_FLAG  ;EXIT AND INDICATE GOOD COMPARE
      SCAN_EXIT:
            JSR    chk_manual_lpbk
 15   SCAN_RET:
            RTS               ;

;------------------------------------------------------------
            EXPORT SCAN_LOSS
      SCAN_LOSS:

20         BCLR   $COMP_FLAG           ;INDICATE BAD COMPARE
            BRSET  HARD_LOOP,SCAN_END   ;if in manual lpbk,do not scan data
            LDA    #INT_CNT_value       ;2 ms delay
            BSR    DELAY_US_WAIT CLR    ERROR_CNT            ;incremented in interrupt every time
 25                                     ;error occurs
            LDA    #INT_CNT_value       ;CHK FOR 10 CLEAN INTERRUPTS IN A ROW.
            BSR    DELAY_US_WAIT
            LDA    ERROR_CNT            ;
            CMP    #01D  ;ERROR_CNT_value_2  ;
 30         BHS    SL_01                ;if number of errors detected exceeds 4
                                        ;then no good
            BSET   $COMP_FLAG           ;INDICATES PATTERN DET. BAD <NO
      COMPARE>
            RTS 35   SL_01:
            BCLR   $COMP_FLAG           ;INDICATES PATTERN DET. BAD <NO
      COMPARE>
            JSR    chk_manual_lpbk
            RTS
 40   ;------------------------------------------------------------
```

```
;********************************************************
; lpbk toward office side
;----------------------------------------------------------
OFFICE_ON:
;       BSET    $ESF_ARM_DET    ;SET FLAG SO disable esf int
        BSET    $LOOP_FLAG_O    ;INDICATE LPBK ACTIVE
        BCLR    $LPBK_LED       ;turn on office lpbk led LDX     #000D           ;
;       BRSET   LOS_LPBK_FLAG,NO_LIS
;       LDA     #LIS_to_fac_value   ;SEND AIS to SPAN
;       BRA     SET_IT
;NO_LIS:
        BSET    spare_cutoff
        BCLR    oos_cutoff
        LDA     #lpbk_no_LIS_value
SET_IT:
        STA     GATE_ARRAY_REG2,X ;MODIFY HEADER BYTE
        JSR     LOAD_GATE_ARRAY ;
        LDA     #02D
        BSR     DELAY_WAIT
        LDA     #main_normal_state_value
        STA     main_current_state
        RTS ;----------------------------------------------------------
;----------------------------------------------------------
OFFICE_OFF:             ;
;       BCLR    $ESF_ARM_DET    ;SET FLAG SO WON'T EXIT LOOP ALSO ESF WILL
LOOP THIS DWN
        BCLR    $LOOP_FLAG_O    ;
        BSET    $LPBK_LED       ;turn off office lpbk led LDA     #main_normal_state_value
        STA     main_current_state ;BSET   oos_cutoff
        RTS ;----------------------------------------------------------
;           MSECONDS DELAY ROTUINE
;           USE MS_COUNTER
;----------------------------------------------------------
        export  DELAY_WAIT
```

```
        DELAY_WAIT:              ;
            STA   MS_COUNTER     ;
        DELAY_LOOP:              ;
            TST   MS_COUNTER     ;WAIT FOR TIMER TO DECREMENT TO ZERO
            BNE   DELAY_LOOP ;
                             ;
            RTS              ;EXIT DELAY

;----------------------------------------------------------------
        ;          200MSECONDS DELAY ROTUINE
        ;          USE SCAN_TMR
        ;----------------------------------------------------------------
            export DELAY_200MS
        DELAY_200MS:
            STA   SCAN_TMR
        DELAY_LOOP1:
            TST   SCAN_TMR       ;WAIT FOR TIMER TO DECREMENT TO ZERO
            BNE   DELAY_LOOP1 ;
            RTS                  ;EXIT DELAY ;----------------------------------------------------------------
        ;
        ; INT_CNTx200 micro seconds dealy
        ;
        ;----------------------------------------------------------------
            export DELAY_US_WAIT DELAY_US_WAIT:           ;
            STA   INT_CNT        ;
        DELAY_US_LOOP:           ;
            TST   INT_CNT        ;WAIT FOR TIMER TO DECREMENT TO ZERO
            BNE   DELAY_US_LOOP ;
                             ;
            RTS              ;EXIT DELAY

;----------------------------------------------------------------

;----------------------------------------------------------------
        ;DELAY LOOP USED BEFORE INTERRUPT IS TURNED ON
        ;----------------------------------------------------------------
            export DELAY_2
        DELAY_2:
            LDA   #05AH
```

```
            LDX    #0FFH
    D_2_LOOP:
            DEX
            BNE    D_2_LOOP
            DECA
            BEQ    D_2_EXIT
            LDX    #0FFH
            BRA    D_2_LOOP
    D_2_EXIT:
            RTS
    ;--------------------------------------------------------------
    ;--------------------------------------------------------------
    ;       export SET_SCAN_TIME SET_SCAN_TIME:
            LDA    #050D
            STA    SCAN_TMR
            RTS
    ;--------------------------------------------------------------
    ;       export SET_SCAN_TIME2
    SET_SCAN_TIME2:
            LDA    #0200D
            STA    SCAN_TMR
            RTS
    ;--------------------------------------------------------------
            export SET_TIME_OUT SET_TIME_OUT:
            LDA    #025D          ; 5 seconds
            STA    SCAN_TMR
            RTS
    ;--------------------------------------------------------------
    SET_TIME_OUT2:
            LDA    #015D          ; 3 seconds
            STA    SCAN_TMR
            RTS
    ;--------------------------------------------------------------
    ;       export SET_ARM_TIMEOUT ;SET_ARM_TIMEOUT:
    ;       LDA    #ARM_TO_TIME_H        ;2 hrs timeout
    ;       STA    TIMEOUT_H
    ;       LDA    #ARM_TO_TIME_L
    ;       STA    TIMEOUT_L
```

```
;       BCLR    timeout_img,bg ;enable arming timeout
;       RTS export SET_LOOP_TIMEOUT SET_LOOP_TIMEOUT:
5           BSET    timeout_flag
            LDA     #LOOP_TO_TIME_H         ;60 mins timeout
            STA     TIMEOUT_H
            LDA     #LOOP_TO_TIME_L
            STA     TIMEOUT_L
10          BCLR    timeout_flag            ;enable loop timeout
            ;BCLR   timeout_disable         ;enable loop timeout
            ;BCLR   rcv_tmout_disable       ;enable loop timeout
            RTS ;----------------------------------------------------------------
15 ;****************************************************************
   ;****************************************************************
   ;**************************************************************** export
            DET_LPUP_CODE,DET_LPDWN_CODE,DET_RESTORE_CODE,DET_QUERY_CODE
20          export DET_TIMEOUT_CODE DET_LPUP_CODE:
            LDA     #LP_UP_CODE     ;PUT IN PATTERN FOR ARMING CODE
            STA     DET_PATTERN     ;PRE LOAD DET_PATTERN VALUE
            LDA     #LP_UP_CODE_2   ;PUT IN PATTERN FOR ARMING CODE
25          STA     DET_PATTERN_2   ;PRE LOAD DET_PATTERN VALUE
            BSR     RCV_DETECT      ;MODIFY GATE_ARRAY_REG
            RTS DET_LPDWN_CODE:
            LDA     #LP_DWN_CODE    ;LOOP DWN CODE
30          STA     DET_PATTERN     ;PRE LOAD DET_PATTERN VALUE
            LDA     #LP_DWN_CODE_2  ;LOOP DWN CODE
            STA     DET_PATTERN_2   ;PRE LOAD DET_PATTERN VALUE
            BSR     RCV_DETECT      ;MODIFY GATE_ARRAY_REG
            RTS 35      DET_RESTORE_CODE:
            LDA     #RESTORE_CODE   ;RESTORE CODE
            STA     DET_PATTERN     ;PRE LOAD DET_PATTERN VALUE
```

```
            LDA   #RESTORE_CODE_2   ;RESTORE CODE
            STA   DET_PATTERN_2     ;PRE LOAD DET_PATTERN VALUE
            BSR   RCV_DETECT        ;MODIFY GATE_ARRAY_REG
            RTS

DET_QUERY_CODE:
            LDA   #QUERY_CODE       ;LOOP DWN CODE
            STA   DET_PATTERN       ;PRE LOAD DET_PATTERN VALUE
            STA   DET_PATTERN_2     ;PRE LOAD DET_PATTERN VALUE
            BSR   RCV_DETECT        ;MODIFY GATE_ARRAY_REG
            RTS

DET_TIMEOUT_CODE:
            LDA   #TIMEOUT_CODE     ;TIMEOUT OVERRIDE CODE
            STA   DET_PATTERN       ;PRE LOAD DET_PATTERN VALUE
            LDA   #TIMEOUT_CODE_2   ;TIMEOUT OVERRIDE CODE
            STA   DET_PATTERN_2     ;PRE LOAD DET_PATTERN VALUE
            BSR   RCV_DETECT        ;MODIFY GATE_ARRAY_REG
            RTS

;*********************************
    ; loss of signal
    ;********************************* export DET_LOS_CODE

DET_LOS_CODE:
            LDA   #LOS_CODE         ;PUT IN PATTERN FOR ARMING CODE
            STA   DET_PATTERN       ;PRE LOAD DET_PATTERN VALUE
            LDA   #LOS_CODE_2       ;PUT IN PATTERN FOR ARMING CODE
            STA   DET_PATTERN_2     ;PRE LOAD DET_PATTERN VALUE
            BSR   RCV_DETECT        ;MODIFY GATE_ARRAY_REG
            RTS export DET_AIS_CODE DET_AIS_CODE:
            LDA   #0FFH             ;PUT IN PATTERN FOR ARMING CODE
            STA   DET_PATTERN       ;PRE LOAD DET_PATTERN VALUE
            STA   DET_PATTERN_2     ;PRE LOAD DET_PATTERN VALUE
            BSR   RCV_DETECT        ;MODIFY GATE_ARRAY_REG
            RTS
```

```
;----------------------------------------------------------------
;----------------------------------------------------------------
          export LOOP_DWN LOOP_DWN:
          JSR   OFFICE_OFF      ;TURN OFF ALL LOOP BACKS
          JSR   chk_los_AIS
          BSR   LOAD_GATE_ARRAY
          LDA   #10D
          JSR   DELAY_WAIT
          BCLR  HARD_LOOP_O     ;turn manual lpbk_O off
          BCLR  LPBK_TO_DISABLE
          RTS
;****************************************************************
;****************************************************************
;****************************************************************
;----------------------------------------------------------------
;This section loads the pattern to be detected into ram map for data going to xilinks
;----------------------------------------------------------------
;----------------------------------------------------------------
          export RCV_DETECT RCV_DETECT:
          LDA   DET_PATTERN
          LDX   #001D
          STA   GATE_ARRAY_REG2,X ;BYTE 2 IN RAM MAP FOR 570X XILINK DESIGN
          LDA   DET_PATTERN_2
          LDX   #002D
          STA   GATE_ARRAY_REG2,X ;BYTE 2 IN RAM MAP FOR 570X XILINK DESIGN
          BSR   LOAD_GATE_ARRAY
          RTS ;*******************************************
;
;*******************************************
          export LOAD_GATE_ARRAY     ;
                                     ;
LOAD_GATE_ARRAY:              ;load shift line is low for xilinx to
                              ;load,
          LDA   #03D           ;wait 600us for xilinx to get ready
          JSR   DELAY_US_WAIT
          CLR   SHFT_CNT       ;high when not loading data to
```

```
                            ;xilinx this is necessary for xilinx
                            ;to process t1 data properly
           BCLR  $LD_SHIFT         ;high to chip select e^2
   LOAD570X:              ;
5  SHFT_LOOP2:            ;
           LDX   SHFT_CNT          ;
           LDA   xmt_xilinx_buffer,X ;load config data for xilink 2 design
           BSR   SND_DATA_8        ;go and shift bits out
           INC   SHFT_CNT          ;
10         LDA   SHFT_CNT          ;
           CMP   #004D             ;map is 8 bits by 4 reg's (4 control reg)
           BNE   SHFT_LOOP2        ;chk if last reg. data has been shipped
   SHFT_EXIT:             ;
   ;       LDA   #011D
15 ;       JSR   DELAY_US_WAIT
           BSET  $LD_SHIFT         ;
           RTS                     ;
   ;***********************************************************************
   ;***********************************************************************
20 ;***********************************************************************
   SND_DATA:              ;
           BCC   SND_ZERO          ;
           BSET  $SER_DATA         ;
           BSET  $SER_CLK          ;
25         BCLR  $SER_CLK          ;
           RTS                     ;
   SND_ZERO:              ;
           BCLR  $SER_DATA         ;
           BSET  $SER_CLK          ;
30         BCLR  $SER_CLK          ;
           RTS                     ;
   ;-------------------------------------------------------------
   ;-------------------------------------------------------------
   ;-------------------------------------------------------------
35         export SND_DATA_8       ;
   SND_DATA_8:            ;
           LDX   #008D             ;
   SD8_LP:                ;
           LSLA                    ;
40         BSR   SND_DATA          ;PULSE DATA TO G.A.
           DEX                     ;
           BNE   SD8_LP            ;
           RTS                     ;
```

```
;----------------------------------------------------------------
        export  SEND_ADDRESS
SEND_ADDRESS:
        LDA    #200
        STA    CCU_ERR_CNT      ; Send address or response
        BSR    SEND_ERRORS      ; Send 1st 1000

LDA    CCU_RESPONSE
        LSLA
        STA    CCU_ERR_CNT      ; Send address or response
        BSR    SEND_ERRORS LDA    #11111000B       ; Disable the error counter (may
        ORA    GATE_ARRAY_REG2  ; not be necessary, but just in case.
        STA    GATE_ARRAY_REG2  ; Don't need to send it yet.  It turns
                                ; out it IS necessary.
        RTS
SEND_ERRORS:
        LDA    GATE_ARRAY_REG2  ; Read Xilinx control register.
        AND    #00000111B       ; Mask out what's already there.
        ORA    #11010000B       ; Program it to send 5 bit errors
        STA    GATE_ARRAY_REG2

BSR    LOAD_GATE_ARRAY  ; Go generate n logic errors.
        LDA    #03
        JSR    DELAY_WAIT       ; Wait a few ms before proceeding
        DEC    CCU_ERR_CNT
        BNE    SEND_ERRORS
        RTS
;----------------------------------------------------------------
        export  SCAN_RPT
SCAN_RPT:         ;Repeats errors every 20 seconds if continuously
                  ;receiving code which requires logic error
                  ;response.
        LDA    #REPEAT_ADDRESS
        BEQ    NO_ADDRESS
SCAN_RPT1:
        LDA    #TIME_20SEC
        STA    qualify_time
        JSR    SCAN_QUALIFY
        BRCLR  $COMP_FLAG,SCAN_RPT_EXIT
        BSR    SEND_ADDRESS     ;Yep there for 20 seconds.
        BRA    SCAN_RPT1
SCAN_RPT_EXIT:
```

```
            RTS

NO_ADDRESS:
        LDA     #TIME_1SEC
        STA     qualify_time
        JSR     SCAN_QUALIFY
        BRCLR   $COMP_FLAG,SCAN_RPT_EXIT
        BRA     NO_ADDRESS
    ;----------------------------------------------------------- list"off"
    #include        define.s
    #include        debounce.s
            list"on"

import0 BPORT
        import0 FLAG1,FLAG4,FLAG3
        import0 main_current_state,SCAN_TMR import OFFICE_ON,LOOP_DWN,SET_LOOP_TIMEOUT
        import main_in_lpbk_value,main_normal_state_value region "MAIN"
    ;-----------------------------------------------------------
    ; Manuel loopback switch checking routine
    ;-----------------------------------------------------------
            export chk_manual_lpbk ;-----------------------------------------------------------
    chk_manual_lpbk:
        BRSET   HARD_LOOP,MANUAL_LOOP_EXIT
        BRSET   MANUAL_LBK_O_N,DN_O         ;JUMP IF NO MANUAL LOOPBACK
        chk_debounce  DN_O,MANUAL_LBK_O_N,CPORT  ;50 ms debounce checking
        BRSET   STATE_CHANGE_O,MANUAL_LOOP_EXIT  ;if no change,jmp
        BSET    STATE_CHANGE_O
        BSET    HARD_LOOP                   ;manual lpbk needs attension
        BSET    man_lpbk_O                  ;manual lpbk
        BRA     MANUAL_LOOP_EXIT
    DN_O:
        BCLR    STATE_CHANGE_O
```

```
        MANUAL_LOOP_EXIT:
           RTS export   DO_MAN_LPBK

DO_MAN_LPBK:
 5         BRSET   LOOP_FLAG_O,clr_office_loop    ;jmp if lpbk was on
           BSET    $timeout_flag
           JSR     OFFICE_ON                       ;CALL LOOPUP SUB-ROUTINE
           LDA     #main_in_lpbk_value
           STA     main_current_state              ;go to LPBK state
10         BSET    HARD_LOOP_O                                  ;set manual lpbk_O to on
           BCLR    man_lpbk_O
           LDA     #025D
           STA     SCAN_TMR        ;SET TIMER FOR 5 SECONDS
        DELAY_LOOP:
15         BRSET   MANUAL_LBK_O_N,MAN_DELAY_EXIT     ;CHECK  FOR  BUTTON  RELEASE
           TST         SCAN_TMR     ;WAIT FOR TIMER TO DECREMENT TO ZERO
           BNE         DELAY_LOOP    ;
           BSET    LPBK_TO_DISABLE
20         BCLR    $timeout_flag
           BCLR    $LPBK_LED       ;turn on office lpbk led
           BRA     MAN_LPBK_EXIT
        MAN_DELAY_EXIT:
           JSR     SET_LOOP_TIMEOUT
25         BCLR    $timeout_flag
           BRA     MAN_LPBK_EXIT
        clr_office_loop:
           JSR     LOOP_DWN
           LDA     #main_normal_state_value      ;go to normal state
30         STA     main_current_state            ;go to normal state
           BCLR    man_lpbk_O
        MAN_LPBK_EXIT:
           RTS list"off"
35      #include    define.s
        #include    debounce.s
           list"on"

import0  qualify_time
           import0  FLAG1,FLAG3,FLAG5
```

```
            import0  BPORT,DPORT
            import0  SF_CURRENT_STATE
            import0  ESF_CURRENT_STATE import DET_LPDWN_CODE
            import TIME_1SEC,CHK_SF_AUTO_SW
            import TIME_4SEC,DET_LPUP_CODE,SCAN_QUALIFY region "MAIN"
;*************************************************
;
chk_nonmon_debounce:        #macro
    BRSET   $1,$2,chk_SW_LOW$$        ;jmp if SW is disable(active low)
    BRSET   $3,$4,chk_nonmon_debounce_EXIT$$    ;jmp with no change in SW and it is enable
    BRA     chk_SW_debounce$$
chk_SW_LOW$$:                        ;SW is deactive
    BRCLR   $3,$4,chk_nonmon_debounce_EXIT$$ ;jmp with no change in SW and it is disable
chk_SW_debounce$$:
    chk_debounce   $5,$1,$2  ;switch changed,50 ms debounce checking
    BSET    $3,$4            ;switch is qualified to be active
    BRA     chk_nonmon_debounce_EXIT$$
$5:                          ;SW is disable    after checking
    BCLR    $3,$4            ;switch is qualified to be deactive
chk_nonmon_debounce_EXIT$$:
    #endm ;********************************
;
;check loopdown code
;
;******************************** export check_loopdown_code check_loopdown_code:
        ;chk_nonmon_debounce    SF_ESF_SW,SF_ESF_FLAG,NOT_AUTO
        BCLR COMP_FLAG
        BCLR LP_2SEC_DET    ;This gets set when we're looking for an BRSET ESF_LED,chk_inband_lpdn
        BRCLR get_esf_lpbk,chk_ia_flag  ;Check if ESF loopdown has been detected
        BRSET $ESF_DWN_DET,esf_DWN_CODE_DET
```

```
       chk_ia_flag:
            LDA  #CHK_SF_AUTO_SW
            BEQ  chk_inband_lpdn
            BRCLR SF_ESF_FLAG,chk_loopdown_exit  ;IN AUTO MODE
 5     chk_inband_lpdn:
            ;BRCLR ESF_LED,clr_main_rcv_state_lpdwn   ;if in esf mode,clr in band rcv state
            ;CLR  ESF_CURRENT_STATE          ;start running esf lpbk det rountine
            LDA  #TIME_1SEC       ;set scan time to 1 second
            STA  qualify_time
10          BCLR $DATA_SEL              ; Force repeater to the side the ESF
            JSR  DET_LPDWN_CODE          ; Look for the usual loopdown codes
            JSR  SCAN_QUALIFY
            BRCLR $COMP_FLAG,clr_loopdown_flag    ;CHECK IF 1ST COMP IS MADE
            BCLR COMP_FLAG               ;we see loopdown code
15          LDA  #CHK_SF_AUTO_SW
            BEQ  check_1
            BRSET ESF_LED,check_1
            BRCLR SF_ESF_FLAG,chk_loopdown_exit  ;IN AUTO MODE
       check_1:
20          BRSET sf_rcv_lpdwn,chk_loopdown_exit  ;jmp if still rcv previous codes
            LDA  #TIME_4SEC       ;set scan time to 3 seconds
            STA  qualify_time
            JSR  SCAN_QUALIFY
            BRCLR $COMP_FLAG,clr_loopdown_flag    ;CHECK IF 1ST COMP IS MADE
25          CLR  SF_CURRENT_STATE         ;clr rcv flags for other codes
            BSET sf_rcv_lpdwn            ;rcv loopdown code
            BRA  chk_loopdown_exit
       clr_loopdown_flag:
            BCLR sf_rcv_lpdwn            ;not rcv loopdown code any more
30          BRA  chk_loopdown_exit
       clr_main_rcv_state_lpdwn:
            CLR  SF_CURRENT_STATE         ;clr rcv flags for other codes
            BRA  chk_loopdown_exit
       esf_DWN_CODE_DET:
35          BSET COMP_FLAG               ;we see loopdown code
            CLR  ESF_CURRENT_STATE          ;start running esf lpbk det rountine
       chk_loopdown_exit:
            RTS ;********************
       ;
40     ;
       ;chk loop up code
```

```
            ;
            ;*******************
            ;
                    export chk_lpup chk_lpup:
 5               chk_nonmon_debounce    SF_ESF_SW,SF_ESF_FLAG,NOT_AUTO
                 BCLR   COMP_FLAG
                 BCLR   LP_2SEC_DET    ;This gets set when we're looking for an address BRSET  ESF_LED,chk_inband_lpup  ;***if in esf mode,clr in band state
                 BRCLR  get_esf_lpbk,chk_ia_flag1
10               BRSET  $ESF_ARM_DET,esf_UP_CODE_DET
         chk_ia_flag1:
                 LDA    #CHK_SF_AUTO_SW
                 BEQ    chk_inband_lpup
                 BRCLR  SF_ESF_FLAG,chk_lpup_EXIT  ;IN AUTO MODE
15       chk_inband_lpup:
                 ;BRCLR ESF_LED,clr_main_rcv_state_arming  ;***if in esf mode,clr in band state
                 ;CLR   ESF_CURRENT_STATE       ;start running esf lpbk det routine
                 LDA    #TIME_1SEC     ;set scan time to 1 second
                 STA    qualify_time
20               BCLR   DATA_SEL       ;set to office side
                 JSR    DET_LPUP_CODE  ;GO SET UP GATE ARRAY
                 JSR    SCAN_QUALIFY   ;CHK IF PATTERN IS BEING RECEIVED for 1 second
                 BRCLR  $COMP_FLAG,clr_arming_flag  ;IF 1ST COMP LINE IS HIGH THEN PATT.
         DETECTED
25               BCLR   COMP_FLAG                   ;we see loopdown code
                 LDA    #CHK_SF_AUTO_SW
                 BEQ    check_2
                 BRSET  ESF_LED,check_2
                 BRCLR  SF_ESF_FLAG,chk_lpup_EXIT  ;IN AUTO MODE
30       check_2:
                 BRSET  sf_rcv_arming,chk_lpup_EXIT
                 LDA    #TIME_4SEC     ;set scan time to 4 seconds
                 STA    qualify_time
                 JSR    SCAN_QUALIFY   ;CHK IF PATTERN IS BEING RECEIVED for 1 second
35               BRCLR  $COMP_FLAG,clr_arming_flag  ;IF 1ST COMP LINE IS HIGH THEN PATT.
         DETECTED
                 CLR    SF_CURRENT_STATE            ;clr rcv flags for other codes
                 BSET   sf_rcv_arming               ;rcv arming code
                 BRA    chk_lpup_EXIT
40       clr_main_rcv_state_arming:
                 CLR    SF_CURRENT_STATE            ;clr rcv flags for other codes
```

```
                BRA    chk_lpup_EXIT clr_arming_flag:
                BCLR   sf_rcv_arming              ;clr rcv flags for other codes
                BRA    chk_lpup_EXIT esf_UP_CODE_DET:
                BSET   COMP_FLAG                  ;we see loopdown code
                CLR    ESF_CURRENT_STATE          ;start running esf lpbk det rountine
        chk_lpup_EXIT:
                RTS list"off"
        #include       define.s
                list"on"

import0  frame_seek_state,state_variable
                import0  ADDR,SCDR,SCSR,CDDR,BDDR
                import0  TCR,CPORT,APORT,BPORT,FLAG5
                import0  power_byte,NONERR_CNT,NONERR_THRES
                import0  SCCR1,SCBRR,SCCR2,TCR_MASK
                import0  COPCR,COPRR
                import0  main_current_state
                import0  SF_CURRENT_STATE
                import0  ESF_CURRENT_STATE
                import0  ESF_IGNORE_STATE
                import0  DL_BYTE_COUNTER import   DL_BYTE_COUNT,xmt_xilinx_buffer
                import   main_normal_state_value import DELAY_2,RAM_START,OPTION
                import OFFICE_OFF,MAIN
                import RAM_END
        ;*****************************************************************
        ;*            CONFIGURE I/O PORTS & TIMER                        *
        ;*****************************************************************
                region "MAIN"

export START

START:                         ;'START' reset vector
```

```
            SEI                 ;disable interrupts
;----------------------------------------------------------------
START1:
        LDA     #11011111B      ;
        STA     CPORT           ;
        LDA     #0CFH           ; set data direction reg.'s
        STA     ADDR            ;
        LDA     #0DFH           ; 1 = output
        STA     BDDR            ;
        LDA     #10101011B ;   0 = input - will change later
        STA     CDDR            ;
;----------------------------------------------------------------
        LDA     #00001111B      ;SET INTIAL VALUES OF PORTS,power led on
        STA     APORT           ;
        LDA     #00111110B      ;
        STA     BPORT           ;
        LDA     #11011111B      ;
        STA     CPORT           ;

BCLR    POWER_LED       ;turn on power led

;----------------------------------------------------------------
        LDA     #0C0H           ;set RAM0 and RAM1 bit gives extra data memory
        STA     OPTION          ;
;----------------------------------------------------------------
;       BSET    $STARTCOM       ;HOLD G.A. IN RESET
        BSET    $CCLK
;----------------------------------------------------------------
;       LDA     #00H            ;LOAD COP CONTROL VALUE
;       STA     COPCR           ;STORE IN CONTROL REG. - FOR WATCHDOG
;----------------------------------------------------------------
;----------------------------------------------------------------
        LDA     #TCR_MASK       ;SET UP TIMER CONTROL REG.
        STA     TCR
;----------------------------------------------------------------
CLEAR_RAM:
        LDA     #00H
        LDX     #00H
RAM_LOOP:
        STA     RAM_START,X
        INX
        CPX     #RAM_END
        BEQ     RAM_DONE
        JMP     RAM_LOOP
```

```
        RAM_DONE:
            JSR     DELAY_2
            JSR     DELAY_2
            JSR     DELAY_2
            JSR     DELAY_2
            JSR     DELAY_2

;       RSP         ;reset stack pointer
        ;----------------------------------------------------------------
        SET_RELAYS:
        ;----------------------------------------------------------------

CLI                 ;turn interrupts loose
            JSR     OFFICE_OFF  ;turn off loopback relays(note: need timer to control relays)
            SEI                 ;turn off interrupts LOOP_SKIP:
        ;----------------------------------------------------------------
        ;   INTIALIZE COUNTERS AFTER RAM CLEAR
        ;----------------------------------------------------------------
            LDA     #NONERR_THRES
            STA     NONERR_CNT
        ;----------------------------------------------------------------
            BSET    $X_RESET
            JSR     DELAY_2
            JSR     DELAY_2
            JSR     DELAY_2
            JSR     DELAY_2
            LDA     #002H
            STA     xmt_xilinx_buffer
        ;   JSR     XILINK      ;CONFIGURE XILINK PART
        ;----------------------------------------------------------------
            BCLR    $SER_CLK ;   LDA     #11101010B  ; 0 = input change bit 193 as input port
        ;   STA     CDDR        ;
            BCLR    0,CDDR BCLR    POWER_LED   ;turn on power led CLR     frame_seek_state    ;initialize esf framing routine
            CLR     state_variable      ;initialize esf framing routine
            ;BSET   power_on_bit        ;xmt power on(I) bit to xilinx
```

```
              LDA    #main_normal_state_value  ;go to normal state
              STA    main_current_state        ;go to normal state
              CLR    SF_CURRENT_STATE          ;initialize rcv states for all codes
              LDA    #DL_BYTE_COUNT            ;RELOAD ESF LOOPCODE DETECT
5             STA    DL_BYTE_COUNTER           ;RELOAD ESF LOOPCODE DETECT
              CLR    ESF_CURRENT_STATE         ;SET TO STATE 0
              CLR    ESF_IGNORE_STATE          ;reset esf ignore state CLI
              LDA    #030H
10            STA    SCBRR                     ;CONFIGURE BAUD RATE - 9600 BUAD (3800Hz)
        w/4MHz xtal
              LDA    #000H
              STA    SCCR1                     ;CONFIGURE SCI CONTROL REG1
         ;    LDA    #02CH
15            STA    SCCR2                     ;CONFIGURE SCI CONTROL REG2
              LDA    SCSR
              LDA    SCDR
;-----------------------------------------------------------------
              LDA    #00001110B ;SET COP FOR 16.54 MS TIME OUT
20            STA    COPCR
              LDA    #055H
              STA    COPRR
              LDA    #0AAH
              STA    COPRR
25            BCLR   POWER_LED    ;turn on power led
              BCLR   LOS_SPARE_FLAG  ;initialize to no los for spare
              BSET   SPAN_AIS
;-----------------------------------------------------------------
              JMP    MAIN    ;<< GO TO MAIN BODY >>
30      ;----------------------------------------------------------------- list"off"
        #include      ..\lib\define.s
              list"on"

import0 FLAG1,FLAG3,APORT,BPORT,CPORT,SLOT_CNT,FLAG4
35            import0 xmt_xilinx_buffer,SCAN_TMR,power_byte,UTMR
              import0 DET_PATTERN,DET_PATTERN_2,CCU_RESPONSE
              import0 ESF_CURRENT_STATE,FLAG5 import  SCAN,OFFICE_ON,OFFICE_OFF,SCAN_RPT,DET_TIMEOUT_CODE
```

```
        import DELAY_200MS,DET_RESTORE_CODE,TIME_15SEC,check_loopdown_code
        import TIME_5SEC,SEND_ADDRESS,RCV_DETECT,DELAY_WAIT
        import XFER_PATTERN,LOAD_GATE_ARRAY,DET_QUERY_CODE
        import DET_LPUP_CODE,DET_LPDWN_CODE,CHK_SF_AUTO_SW 5       region "MAIN"

e     x      p      o      r      t
        CHK_RESTORE_CODE,CHK_MAN_RESTORE,TRANSFER,RESTORE_PATHS
            export CHK_FOR_XFER,CHK_QUERY_CODE,CHK_TIMEOUT_CODE CHK_RESTORE_CODE:
10          BCLR  COMP_FLAG
            BCLR  LP_2SEC_DET       ;This gets set when we're looking for
            BCLR  $DATA_SEL         ;Force repeater to spare side
            JSR   DET_RESTORE_CODE
            JSR   SCAN
15          BRCLR COMP_FLAG,CHECK_OOS
            LDA   SLOT_CNT
            INCA
            STA   CCU_RESPONSE
            JSR   RESTORE_PATHS
20          BCLR  $framer_side      ;Return framer to spare side
            BSET  $MAINT_FLASH
            LDA   #50
            JSR   DELAY_WAIT
            JSR   OFFICE_ON
25          JSR   SCAN
            BRCLR COMP_FLAG,EXIT_OUT
            JSR   SEND_ADDRESS
            JSR   SCAN_RPT
        EXIT_OUT:
30          JSR   OFFICE_OFF
            BCLR  $MAINT_FLASH
            BSET  $MAINT_LED
            BSET  $COMP_FLAG
            RTS 35      CHECK_OOS:
            BSET  $DATA_SEL         ;Force repeater to out of service side
            JSR   SCAN
            BRCLR COMP_FLAG,CHK_RESTORE_END
            BSET  $MAINT_FLASH
40          LDA   SLOT_CNT
```

```
        INCA
        STA    CCU_RESPONSE
        JSR    SEND_ADDRESS
        JSR    SCAN_RPT
5       LDA    #TIME_15SEC
        JSR    DELAY_200MS
        BSR    RESTORE_PATHS
        BCLR   $MAINT_FLASH
        BSET   $MAINT_LED
10      BCLR   $framer_side          ;Return framer to spare side
        BSET   $COMP_FLAG
CHK_RESTORE_END:
        RTS CHK_MAN_RESTORE:
15      BCLR   $COMP_FLAG
        BRSET  RESTORE_SW,CHK_RESTORE_END   ;RESTORE BUTTON NOT PUSHED
        LDA    #TIME_5SEC
        STA    SCAN_TMR
DELAY_5_SEC:
20      BRSET  RESTORE_SW,DEBOUNCE_REST     ;RESTORE BUTTON RELEASED
        TST    SCAN_TMR                     ;WAIT FOR TIMER TO DEC. TO ZERO
        BNE    DELAY_5_SEC
        BSET   $MAINT_FLASH
        BRA    WAIT_FOR_RELEASE
25  DEBOUNCE_REST:
        LDA    #100
        JSR    DELAY_WAIT                   ;DEBOUNCE 100MS
        BRCLR  RESTORE_SW,DELAY_5_SEC       ;RETURN TO ROUTINE
        BRA    CHK_RESTORE_END 30  WAIT_FOR_RELEASE:
        BRCLR  RESTORE_SW,WAIT_FOR_RELEASE
        LDA    #100
        JSR    DELAY_WAIT                   ;DEBOUNCE 100MS
        BRCLR  RESTORE_SW,WAIT_FOR_RELEASE 35      LDA    #TIME_15SEC
        STA    SCAN_TMR
DELAY_15_SEC:
        BRCLR  RESTORE_SW,EXIT_MAN_RESTORE1 ;RESTORE BUTTON PRESSED AGAIN
40      TST    SCAN_TMR                     ;WAIT FOR TIMER TO DEC. TO ZERO
        BNE    DELAY_15_SEC
```

```
            BSR   RESTORE_PATHS
            BSET  $COMP_FLAG
    EXIT_MAN_RESTORE:
            BCLR  $MAINT_FLASH
 5          BSET  $MAINT_LED
            RTS
    EXIT_MAN_RESTORE1:
            BCLR  $MAINT_FLASH
            BRCLR RESTORE_SW,EXIT_MAN_RESTORE1
10          BCLR  $MAINT_LED
            RTS

RESTORE_PATHS:
            LDA   #00H
            STA   SLOT_CNT
15          BSET  SENSE_PIN
            LDA   #100
            JSR   DELAY_WAIT
            BCLR  MAINT_RLY
            BSET  spare_cutoff          ;turn on spare output
20          BCLR  oos_cutoff            ;turn off oos output
    RESTORE_PATHS1:
            BSET  RLY_RESET             ;DISENGAGE ALL RELAYS
            LDA   xmt_xilinx_buffer
            AND   #00000111B
25          STA   xmt_xilinx_buffer
            JSR   LOAD_GATE_ARRAY
            RTS CHK_FOR_XFER:
            INC   SLOT_CNT
30          LDA   SLOT_CNT
            CMP   #07                   ;CANT DO SLOT 8 - CCU SLOT
            BEQ   CHK_FOR_XFER
            CMP   #16
            BLO   CHK_CONT
35          CLRA
            STA   SLOT_CNT
    CHK_CONT:
            BCLR  $COMP_FLAG
            BCLR  $LP_2SEC_DET
40          JSR   DET_XFER_CODE
            JSR   SCAN
            BRCLR $COMP_FLAG,CHK_EXIT
```

```
            JSR   CHK_TRANSFER
            LDA   SLOT_CNT
            CMP   #30
            BEQ   CHK_EXIT
 5          LDA   #TIME_15SEC
            STA   UTMR
        WAIT_15:
            JSR   check_loopdown_code
            BRCLR $COMP_FLAG,CONT_WAIT
10          BCLR  $MAINT_FLASH
            BSET  $MAINT_LED
            LDA   #55H
            RTS
        CONT_WAIT:
15          TST   UTMR
            BNE   WAIT_15
            BSR   TRANSFER
            BCLR  $MAINT_FLASH
            ;BCLR SENSE_PIN            ;POWER UP DIODE
20          LDA   #04
            JSR   DELAY_200MS
            BSET  MAINT_RLY
            BCLR  SENSE_PIN             ;POWER UP DIODE
            BCLR  spare_cutoff          ;turn off spare output
25          ;BSET oos_cutoff            ;turn on oos output
            BSET  $framer_side          ;Put framer on oos side
            BCLR  $MAINT_LED
            BSET  $COMP_FLAG
            CLRA
30          RTS

CHK_EXIT:
            BCLR  $COMP_FLAG
            CLRA
            RTS

35      CHK_TRANSFER:
            BSET  GOOD_PATH
            BSR   TRANSFER
            LDA   #04
            JSR   DELAY_200MS
40          BRCLR SWAP_PIN,GO_AHEAD
            BSR   RESTORE_PATHS1
            BCLR  GOOD_PATH
```

```
            LDA   #100
            JSR   DELAY_WAIT
            LDA   #30
            STA   SLOT_CNT
 5          STA   CCU_RESPONSE
            JSR   SEND_ADDRESS
            JSR   SCAN_RPT
            RTS

GO_AHEAD:
10          JSR   RESTORE_PATHS1
            BSET  $MAINT_FLASH
            LDA   #03
            JSR   DELAY_200MS
            LDA   SLOT_CNT
15          INCA
            STA   CCU_RESPONSE
            JSR   SEND_ADDRESS
            JSR   SCAN_RPT
            RTS

20      TRANSFER:
            BSET  RLY_RESET            ;DISENGAGE RELAYS
            LDA   SLOT_CNT
            LSLA
            LSLA
25          LSLA
            ;ORA  #00000111B
            ORA   xmt_xilinx_buffer
            STA   xmt_xilinx_buffer
            JSR   LOAD_GATE_ARRAY
30          LDA   #02
            JSR   DELAY_200MS
            ;BCLR RLY_RESET             ;SET CORRECT RELAY
            BSR   SET_RELAY
            RTS 35      DET_XFER_CODE:
            LDX   SLOT_CNT
            LSLX
            LDA   XFER_PATTERN,X
            STA   DET_PATTERN          ;PRE LOAD DET_PATTERN VALUE
40          INCX
            LDA   XFER_PATTERN,X
```

```
              STA  DET_PATTERN_2    ;PRE LOAD DET_PATTERN VALUE
              JSR  RCV_DETECT
              RTS

SET_RELAY:
 5            BCLR RLY_RESET
              BCLR LD_SHIFT
              LDA  #10
              JSR  DELAY_WAIT
              BSET LD_SHIFT
10            RTS

CHK_QUERY_CODE:
              ;BSET $DATA_SEL         ;Force repeater to OOS side
              BCLR COMP_FLAG
              BCLR LP_2SEC_DET        ;This gets set when we're looking for
15            JSR  DET_QUERY_CODE
              JSR  SCAN
              BRSET COMP_FLAG,CHK_QUERY_CONT
              ;BCLR rcv_query_code
              BRA  CHK_QUERY_END
20     CHK_QUERY_CONT:
              ;BRSET rcv_query_code,CHK_QUERY_END
              ;BSET rcv_query_code
              BRSET $DATA_SEL,Q1
              LDA  #35
25            BRA  Q2
       Q1:
              LDA  SLOT_CNT
              INCA
       Q2:
30            STA  CCU_RESPONSE
              JSR  SEND_ADDRESS
              JSR  SCAN_RPT
       CHK_QUERY_END:
              BCLR COMP_FLAG
35            RTS CHK_TIMEOUT_CODE:
              ;BSET $DATA_SEL         ;Force repeater to OOS side
              BCLR COMP_FLAG
              BCLR LP_2SEC_DET        ;This gets set when we're looking for
40            JSR  DET_TIMEOUT_CODE
```

```
                JSR   SCAN
                BRCLR COMP_FLAG,CHK_TIMEOUT_END

BSET  LPBK_TO_DISABLE
                BCLR  $timeout_flag
5               BCLR  $LPBK_LED        ;turn on office lpbk led
                LDA   #35
                STA   CCU_RESPONSE
                JSR   SEND_ADDRESS
                JSR   SCAN_RPT
10       CHK_TIMEOUT_END:
                BCLR  COMP_FLAG
                RTS ;
         ;***********************************
15       ;
         ;check loopdown code
         ;
         ;*********************************** export chk_oos_lpdn 20       chk_oos_lpdn:
                BCLR  COMP_FLAG
                BCLR  LP_2SEC_DET   ;This gets set when we're looking for an BRSET ESF_LED,chk_inband_lpdn
                BRCLR get_esf_lpbk,chk_ia_flag  ;Check if ESF loopdown has been detected
25              BRSET $ESF_DWN_DET,esf_DWN_CODE_DET
         chk_ia_flag:
                LDA   #CHK_SF_AUTO_SW
                BEQ   chk_inband_lpdn
                BRCLR SF_ESF_FLAG,chk_loopdown_exit ;IN AUTO MODE
30       chk_inband_lpdn:
                BSET  $DATA_SEL           ; Force repeater to the oos side
                JSR   DET_LPDWN_CODE             ; Look for the usual loopdown codes
                JSR   SCAN
         chk_loopdown_exit:
35              RTS esf_DWN_CODE_DET:
                BSET $COMP_FLAG
                CLR  ESF_CURRENT_STATE
```

```
                RTS

;********************
;
;chk loop up code
;
;******************** export chk_oos_lpup chk_oos_lpup:
        BCLR  COMP_FLAG
        BCLR  LP_2SEC_DET    ;This gets set when we're looking for an address BRSET ESF_LED,chk_inband_lpup
        BRCLR get_esf_lpbk,chk_ia_flag1  ;Check if ESF loopup has been detected
        BRSET $ESF_ARM_DET,esf_UP_CODE_DET
chk_ia_flag1:
        LDA   #CHK_SF_AUTO_SW
        BEQ   chk_inband_lpup
        BRCLR SF_ESF_FLAG,chk_loopup_exit  ;IN AUTO MODE
chk_inband_lpup:
        BSET  DATA_SEL              ;set to oos side
        JSR   DET_LPUP_CODE          ;GO SET UP GATE ARRAY
        JSR   SCAN                   ;CHK IF PATTERN IS BEING RECEIVED
chk_loopup_exit
        RTS esf_UP_CODE_DET:
        BSET  $COMP_FLAG
        CLR   ESF_CURRENT_STATE
        RTS ;********************
;
;chk for loss of line card
;
;******************** export chk_card_loss chk_card_loss:
        BCLR  $COMP_FLAG
        BRCLR $SWAP_PIN,exit_card_loss    ;check for dni, branch if there is
```

```
        JSR    RESTORE_PATHS
        BSET   $MAINT_LED
        BSET   $COMP_FLAG
exit_card_loss:
        RTS region  "MAIN"

export  XFER_PATTERN

;----------------------------------------------------------------
XFER_PATTERN:
        DW     0C441H      ; DNI SLOT  1
        DW     0C442H      ; DNI SLOT  2
        DW     0C443H      ; DNI SLOT  3
        DW     0C444H      ; DNI SLOT  4
        DW     0C445H      ; DNI SLOT  5
        DW     0C446H      ; DNI SLOT  6
        DW     0C447H      ; DNI SLOT  7
        DW     0C448H      ; DNI SLOT  8
        DW     0C449H      ; DNI SLOT  9
        DW     0C44AH      ; DNI SLOT 10
;
        DW     0C44BH      ; DNI SLOT 11
        DW     0C44CH      ; DNI SLOT 12
        DW     0C44DH      ; DNI SLOT 13
        DW     0C44EH      ; DNI SLOT 14
        DW     0C44FH      ; DNI SLOT 15
        DW     0C450H      ; DNI SLOT 16
        DW     0C451H      ; DNI SLOT 17
        DW     0C452H      ; DNI SLOT 18
        DW     0C453H      ; DNI SLOT 19
        DW     0C454H      ; DNI SLOT 20
;
        DW     0C455H      ; DNI SLOT 21
        DW     0C456H      ; DNI SLOT 22
        DW     0C457H      ; DNI SLOT 23
        DW     0C458H      ; DNI SLOT 24
        DW     0C459H      ; DNI SLOT 25
        DW     0C45AH      ; DNI SLOT 26
        DW     0C45BH      ; DNI SLOT 27
```

The preferred embodiment of the invention, and the manner and making and using it, is now described in such a full, clear and concise manner as to allow a person of ordinary skill in the art to make and use the same. To particularly point out and distinctly claim the subject matter regarded as invention, the following claims conclude this specification.

I claim:

1. A protective switching mechanism for at least one network interface unit that is interconnectable to multiple transmission lines, said transmission lines including a plurality of service lines and at least one spare line, said transmission lines carrying a transfer signal and a restoration of service signal from a telephone company central office, said central office noting that a particular one of said service lines is defective and responsively issuing a transfer signal on at least one of said transmission lines and further noting that said particular one of said service lines is repair and responsively issuing a restoration of service signal on at least one of said transmission lines, said protective switching mechanism comprising, in combination:

a bus across said service lines and spare line, said bus including switches for interconnecting and disconnecting, upon receiving a command, at least one of said transmission lines with respect to said bus, and control means for (a) responding to said transfer signal by issuing said command to said switches to interconnect said spare line to said bus and disconnect said particular one of said service lines from said bus, (b) recognizing said restoration of service signal on said particular one of said service lines, and (c) issuing said command to said switches to interconnect said bus and said particular one of said service lines in response to said restoration of service signal, whereby said control means reconnects said particular one of said service lines to said bus and disconnects said spare line from said bus.

2. A protective switching mechanism as claimed in claim 1 wherein said service lines and spare line constitute wire transmission lines.

3. A protective switching mechanism as claimed in claim 2 wherein said control means comprises a microprocessor.

4. A protective switching mechanism as in claim 1 wherein said transmission lines carry data and said data includes said restoration of service signals, and wherein said control means comprises:

pattern detector means, interconnected to said bus for monitoring said data for a pattern that includes said restoration of service signal and responsively providing a pattern signal;

a microprocessor, interconnected to said pattern detector means, for receiving said pattern signal from said pattern detector and responsively issuing said command to said bus; and a relay driver, within said bus and interconnected to said microprocessor, said relay driver receiving said command and responsively activating said switches to interconnect and disconnect at least one of said transmission lines with respect to said bus.

5. A protective switching mechanism as claimed in claim 1, wherein said restoration of service signal is carried on said spare line.

6. A protective switching mechanism as claimed in claim 1, wherein said restoration of service signal is carried on said particular one of said service lines.

7. A protective switching mechanism, as claimed in claim 1, wherein said control means also recognizes said restoration of service signal on said spare line.

* * * * *